US012762461B2

(12) United States Patent
Sengupta et al.

(10) Patent No.: US 12,762,461 B2
(45) Date of Patent: Oct. 13, 2026

(54) TRAINING AND DEPLOYING MODELS USING GLOBAL RESOURCE LEVELS

(71) Applicant: Aible Inc., Foster City, CA (US)

(72) Inventors: Arijit Sengupta, Foster City, CA (US); Jonathan Wray, Foster City, CA (US); Joseph Veltkamp, Foster City, CA (US); Richard Cooke, Foster City, CA (US); John Delaney, Foster City, CA (US)

(73) Assignee: Aible Inc., Pleasanton, CA (US)

( * ) Notice: Subject to any disclaimer, the term of this patent is extended or adjusted under 35 U.S.C. 154(b) by 1119 days.

(21) Appl. No.: 17/155,458

(22) Filed: Jan. 22, 2021

(65) Prior Publication Data

US 2022/0237499 A1 Jul. 28, 2022
US 2024/0420008 A9 Dec. 19, 2024

Related U.S. Application Data

(60) Provisional application No. 62/965,792, filed on Jan. 24, 2020.

(51) Int. Cl.
*G06N 20/00* (2019.01)

(52) U.S. Cl.
CPC .................................... *G06N 20/00* (2019.01)

(58) Field of Classification Search
CPC .... G06N 20/00; G06N 20/20; G06Q 10/0631; G06Q 30/0201; G06Q 30/0202
See application file for complete search history.

(56) References Cited

U.S. PATENT DOCUMENTS

| | | | | |
|---|---|---|---|---|
| 8,380,563 | B2 * | 2/2013 | Datar | G06Q 30/0277 |
| 8,572,115 | B2 * | 10/2013 | Hubinette | G06Q 30/02 |
| 10,809,936 | B1 * | 10/2020 | Kaushik | G06F 3/067 |
| 2013/0246167 | A1 * | 9/2013 | Qin | G06Q 30/0256 |
| 2020/0310876 | A1 * | 10/2020 | Featonby | G06F 9/505 |
| 2020/0311616 | A1 * | 10/2020 | Rajkumar | G06F 16/285 |
| 2023/0034384 | A1 * | 2/2023 | Mao | G06N 5/04 |

OTHER PUBLICATIONS

Long, Guodong, et al. "Federated learning for open banking." (Year: 2020).*

(Continued)

*Primary Examiner* — Michelle T Bechtold
*Assistant Examiner* — Matiyas T Maru
(74) *Attorney, Agent, or Firm* — Mintz Levin Cohn Ferris Glovsky and Popeo PC

(57) ABSTRACT

A method includes receiving data characterizing a first output of one or more of a first set of models associated with a first organization, the first set of models trained on a first dataset using a first set of resourcing levels; training one or more of a second set of models associated with a second organization based on a second dataset using a second set of resourcing levels, global constraints and the first output, wherein the second set of resourcing levels specifying a second condition on outputs of the one or more of the second set of models; assessing, based on a second output of the one or more of the second set of models, performance of the one or more of second set of models; and retraining the first set of models or a subset thereof. Related apparatus, systems, articles, and techniques are also described.

24 Claims, 18 Drawing Sheets

(56) References Cited

OTHER PUBLICATIONS

Sui, Dianbo, et al. "Feded: Federated learning via ensemble distillation for medical relation extraction." (Year: 2020).*
Aryafar, Kamelia, Devin Guillory, and Liangjie Hong. "An ensemble-based approach to click-through rate prediction for promoted listings at Etsy." (Year: 2017).*
Zhang, Haoyu, et al. "Slaq: quality-driven scheduling for distributed machine learning." Proceedings of the 2017 Symposium on Cloud Computing. (Year: 2017).*
Sun, Yaohua, et al. "Application of machine learning in wireless networks: Key techniques and open issues." (Year: 2019).*
Zhu, You, et al. "Comparison of individual, ensemble and integrated ensemble machine learning methods to predict China's SME credit risk in supply chain finance." (Year: 2017).*
He, Chaoyang, "Group knowledge transfer: Federated learning of large cnns at the edge" (Year: 2020).*
Hard, Andrew, et al. "Federated learning for mobile keyboard prediction." (Year: 2018).*
Park, et al. "Distilling on-device intelligence at the network edge", (Year: 2019).*
Wang, et al., "Eavesdrop the composition proportion of training labels in federated learning", (Year: 2019).*
Long, Guodong, et al. "Federated learning for open banking", 2020. 240-254. (Year: 2020).*
Zhang, Michael, et al. "Personalized federated learning with first order model optimization" (Year: 2020).*

* cited by examiner

600

800

900

1000

1300

1600

1800

TRAINING AND DEPLOYING MODELS USING GLOBAL RESOURCE LEVELS

CROSS-REFERENCE TO RELATED APPLICATION

This application claims priority under 35 U.S.C. § 119(e) to U.S. Provisional Patent application No. 62/965,792 filed Jan. 24, 2020, the entire contents of which is hereby expressly incorporated by reference herein.

TECHNICAL FIELD

The subject matter described herein relates to training and deploying models under varying global resource levels and automatically adjusting to new resource levels and/or changes in organization objectives.

BACKGROUND

In predictive analytics, accuracy may not be a reliable metric for characterizing the performance of a predictive model. This is because accuracy can yield misleading results, particularly to a non-expert business user and particularly where the dataset is unbalanced or the cost of error of false negatives and false positives is mismatched. An unbalanced dataset can include a dataset where the number of observations in different classes vary. For example, if there were 95 cats and only 5 dogs in the data, a particular predictive model (e.g., classifier) might classify all of the observations as cats. The overall accuracy of the predictive model would be 95%, but the model would have a 100% recognition rate (e.g., true positive rate, sensitivity) for the cat class but a 0% recognition rate for the dog class.

SUMMARY

In an aspect, a method includes receiving data characterizing a first output of one or more of a first set of models associated with a first organization, the one or more of the first set of models trained on a first dataset; training one or more of a second set of models associated with a second organization based on a second dataset, global constraints and the first output; assessing, based on a second output of the one or more of the second set of models, performance of the one or more of second set of models; and retraining the first set of models or a subset thereof.

One or more of the following features can be included in any feasible combination. For example, the method can include providing information associated with the assessment and/or the second output to the first set of models. The received data can characterize the first output of the one or more of the first set of models includes the global constraints and/or first set of resourcing levels. The second set of resourcing levels can be determined based on the first set of resourcing levels. The method can include training one or more of the first set of models, wherein the training is based on one or more of the global constraint, the second output of the one or more of the second set of models, the first set of resource levels, and training data associated with the first set of models. The method can include receiving a user input from a user associated with the second set of models, the input indicative of user constraints on the first output of the one or more of the first set of models; and training, the one or more of the first set of models, based on the user input.

The method can include assessing a combined performance of the first set of models and the second set of models; determining, using the combined performance, a global feasible performance region, wherein the global feasible performance region is associated with balanced values of the first and the second set of resourcing levels; and displaying the global feasible performance region. The method can include receiving a user input from a user associated with the second set of models, the input indicative of user constraints on the first output of the one or more of the first set of models; and determining new second set of resourcing levels based on the global constraints and the user input; training, the one or more of the second set of models, based on the new second set of resourcing levels.

The method can include training the first set of models. The training can include receiving data characterizing the first set of models trained on the first dataset using the first set of resourcing levels, the first set of resourcing levels specifying a condition on outputs of the first set of models; assessing, using the first set of resourcing levels, performance of the first set of models; determining, using the assessment, a first feasible performance region, the first feasible performance region associating each resourcing level in the first set of resourcing levels with a model in the first set of models; and displaying the first feasible performance region.

The method can include determining that the second set of resourcing levels are unbalanced with respect to the first set of resourcing levels; modifying the first set of resourcing levels and the second set of resourcing levels to increase a performance of the first set of models and the second set of models; and retraining at least the second set of models or a subset thereof.

The method can include determining a new first set of resourcing levels corresponding to a first ratio of value per action or cost per action associated with the first set of models; and determining a new second set of resourcing levels such that a second ratio of value per action or cost per action associated with the second set of models. The first ratio and the second ratio can be equal.

The method can include receiving user input from a user associated with the second set of models, the input indicative of a new second resource levels; determining new first set of resourcing levels; selecting or training the first set of models using the new first set of resourcing levels; and selecting or training the second set of models using the new second set of resourcing levels. The method can include receiving data characterizing user input specifying a training objective and the first set of models can be trained based at least on the training objective.

In another aspect, a first model associated with a first organization based on a first dataset is trained. The first model includes a first plurality of submodels trained at differing resource levels. A second model associated with a second organization is trained based on a second dataset. The second model includes a second plurality of submodels trained at the differing resource levels. A resource allocation is determined between the first organization and the second organization such that a first level of resource is provided to the first organization and a second level of resource is provided to the second organization. A first subgroup is selected from the first model that corresponds to the first resource level. A second subgroup is selected from the second model that corresponds to the second resource level.

One or more of the following features can be included in any feasible combination. For example, determining the resource allocation can include determining an optimal allocation of resources between the first organization and the second organization and based at least on a global constraint.

Data can be received characterizing a change to the global constraint or a new global constraint. A second resource allocation between the first organization and the second organization can be determined such that a third level of resource is provided to the first organization and a fourth level of resource is provided to the second organization. The determining the second resource allocation can be based at least on the change to the global constraint or the new global constraint. A third subgroup from the first model that corresponds to the third resource level can be selected. A fourth subgroup from the second model that corresponds to the fourth resource level can be selected. Determining the resource allocation can include determining an optimal allocation of resources between the first organization and the second organization based at least on an organizational objective.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Figure 1:
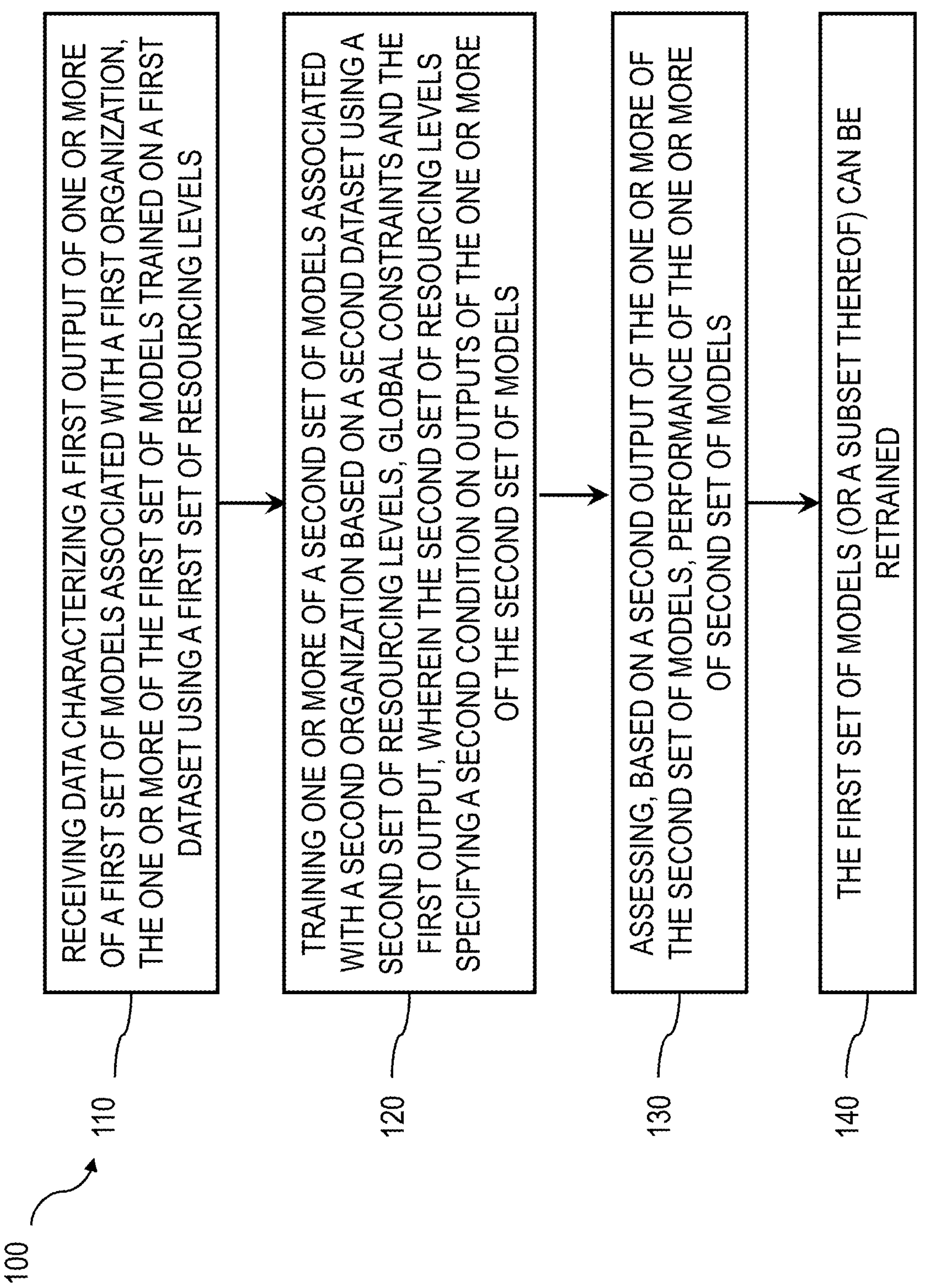
FIG. 1 is a process flow diagram illustrating an exemplary method of training and assessing models in various organizations in an business operation.

Models can by employed in a business operation to perform specific tasks quickly and efficiently. These models can be trained without the supervision of a data scientist, and as a result, can continue to adapt to perform with desirable efficiency and accuracy. Business operations are becoming increasingly complex and require multiple organizations (or portions of an organization) to work in tandem. The various organizations can develop their own models that can be based on their database of training data and operating constraints. A first model optimized for a first constraint can generate a range of performance indices for the same set of input data but different constraints. The range of performance indices can be plotted as a function of constraints, which can be referred to as a feasible performance region of the models. For example, the feasible performance region can include a boundary representing, for the set of models trained under the different constraints, predictions as a function of the given constrained parameter and an indication of the model that produced a given prediction. Feasible performance regions are described in more detail below with reference to FIGS. 4 and 5.

In order to allow for seamless business operation, it can be desirable that the models employed by the various organizations communicate with each other and enhance their operation based on the operating constraints of multiple organizations. For example, the training of a first model or set of models (e.g., in a marketing department) can be coupled to the operation and/or training of one or more models employed in a different department (e.g., sales department). In some implementations, the output of one model can be used to train another model. In another implementation, the expected output (or outputs) from one model can be used to set the operational constraints of a downstream model. Additionally or alternately, training of the various models can account for global constraints that are applicable to the entire business operation or multiple organizations involved in the business operation. For example, by training models for a given department (e.g., sales) dependent on another department (e.g., marketing), the entire business operation can be improved (e.g., optimized).

In some implementations, a model (or a plurality of models) of a first organization of the business operation can be trained, assessed, and deployed for one or more constraints (e.g., predefined inputs, target performance, and the like). The training can be based on training data (e.g., training data associated with the first organization) and can generate a model for a given constraint (e.g., a resourcing level variable). In some implementations, if there are multiple constraints associated with the first organization, multiple models can be generated. The set of models that include models trained for different constraints (or resource levels) can be referred to as an efficient frontier. (The details of training of the models for a given organization is provided below in the section "TRAINING MODELS FOR AN ORGANIZATION BASED ON ORGANIZATIONAL CONSTRAINTS"). Each model can be deployed to receive input data (e.g., data associated with the first organization) and generate a performance index (also referred to as "impact").

Although some examples described herein relate to optimizing operations, the current subject matter is not limited to operations and can apply to a broad range of applications. For example, in dynamic marketing allocation based on inventory levels and production capacity, if an item is low on inventory or selling close to production capacity, marketing efforts can be reduced to prevent stock outs, and/or capacity/inventory can be increased. Additionally or alternately, further downstream functions such as customer service and support, the productivity of the sales efficient frontier, etc., can feed into required support and service staffing. The desirable (e.g., optimal) level of quality control inspections can be balanced with the speed of production as faster production speed can increase output with increased risk of quality issues. The two frontiers can balance speed and inspection costs. In one implementation, setting the optimal number attendees for a festival can be linked with the efficient frontier (e.g., set of models trained for different levels of constrains or resources) of how many food stands to have open to maximize overall profitability of a festival.

FIG. 1 is a process flow diagram illustrating an exemplary method of training and assessing models in various organizations in a business operation.

At 110, data characterizing a first output of one or more of a first set of models associated with a first organization is received. As described above, the first set of models can be trained based on a first dataset using a first set of resourcing levels (e.g., constraints). In some implementations, the received data can include a global constraint. The second set of models can be driven by the output of the first set of models. For example, the output of a marketing model (in the first set of models) can provide qualified leads to the sales model (in the second set of models).

In one implementation, if marketing spend is aggressive, multiple qualified leads (e.g., 2000 qualified leads) can be provided to the sales models of which a subset (e.g., 800 qualified leads) can be converted into sales. The sales model can balance itself to support the incoming leads appropriately. For example, if the sales headcount cannot be increased and the existing sales team can only work 1000 leads per month, then the marketing model can adjust to a new point on the efficient frontier (e.g., the model associated with the new constraint level is utilized) to reduce the input to sales to match the number of inputs.

In some implementations, the sales capacity may not be increased to handle more than 1000 leads. The output of the first set of models can define the population for the second set of models. This can impact the balancing of the efficient frontiers.

In some implementations, there can be three potential balance levels, first if the first set of models are constrained (e.g., limited marketing budget) and the second set of models can be over resourced. In this case, the second set of models can shift to a more conservative level (e.g., reduce sales resources) to balance the input. Alternately, in another implementation, if the second set of models are constrained (e.g., due to limited sales headcount) then the first set of models can adjust to a more conservative level (e.g., reduce marketing spend). In yet another implementation, if there is no constraints on either the first or the second set of models, then the efficient frontiers can be balanced to maximize impact to the business based on the maximum output across both functions. In such cases the 'spend' on each model can be increased in tandem as long as overall profitability is increased and the two models remain in balance.

At 120, one or more of a second set of models associated with a second organization are trained. The training can be based on a second dataset using a second set of resourcing levels, the first output from the first set of models (e.g., received at step 110), global constraints, and the like. The second set of resourcing levels can be indicative of constraints (e.g., predetermined constraints) on the second set of models. The second set of resourcing levels can specify a second condition on outputs of the one or more of the second set of models.

The second set of models can be trained on training data that can be independent from the output of the first set of models. For example, sales opportunities can come from a different system than marketing leads, and may not be directly related to marketing leads via unique identifiers. Additionally, the efficient frontier for the second set of models can generate the efficient models for different cost benefit tradeoffs, constraints, or populations. The first and the second set of models can be coupled through the volume of output of the first set of models (e.g., 1000 leads which are the output of the first set of models). In some implementations, the output of the first set of models can determine the population and capacity constraint that determines the optimal performance point on the second efficient frontier (associated with the second set of models).

Figure 6:
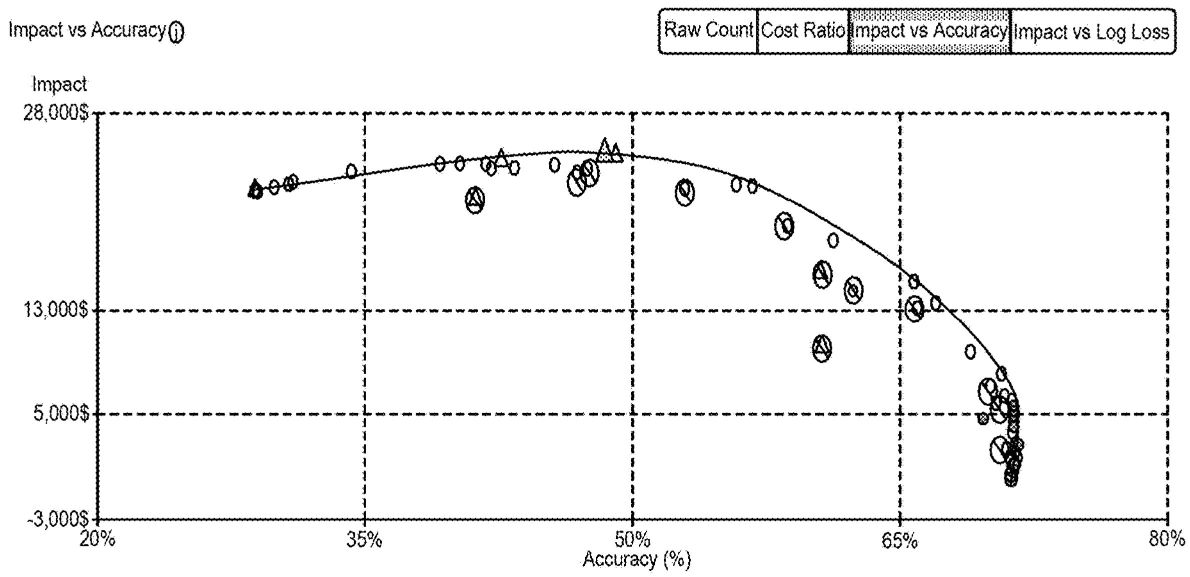
FIG. 6 illustrates a plot of an exemplary efficient frontier.
Figure 7:
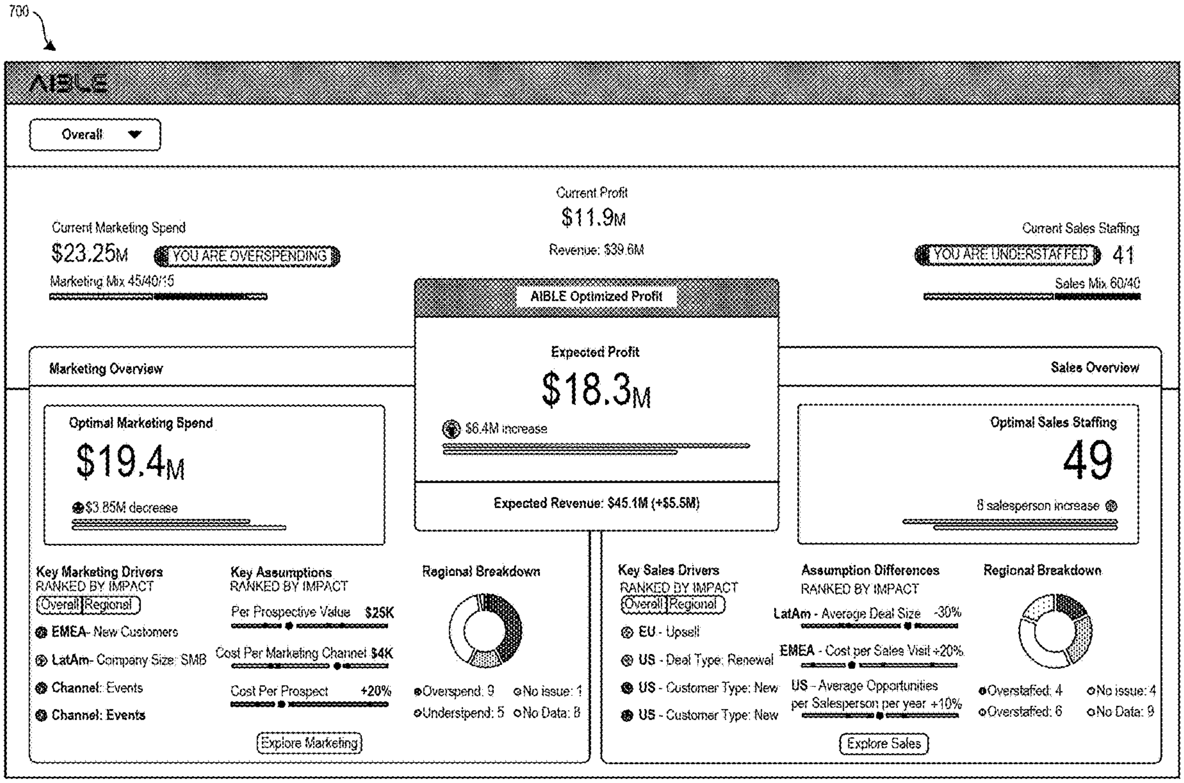
FIGS. 7-11 illustrate an example user interface illustrating example implementations of the current subject matter.
Figure 8:
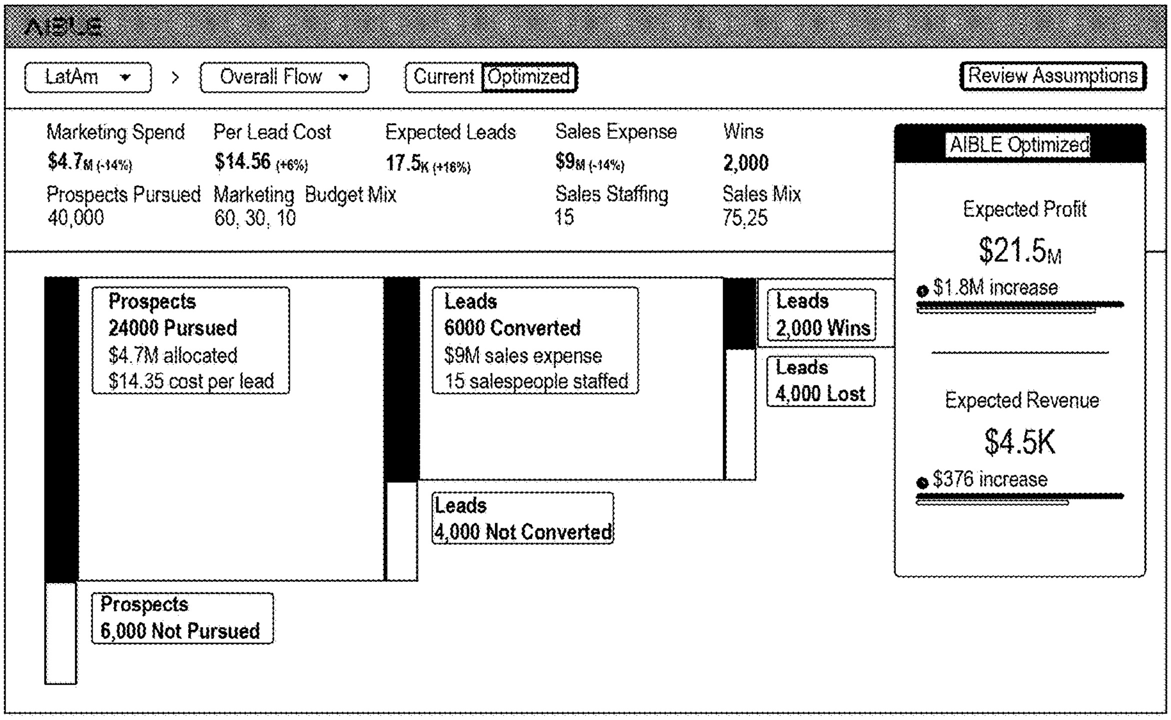
Figure 9:
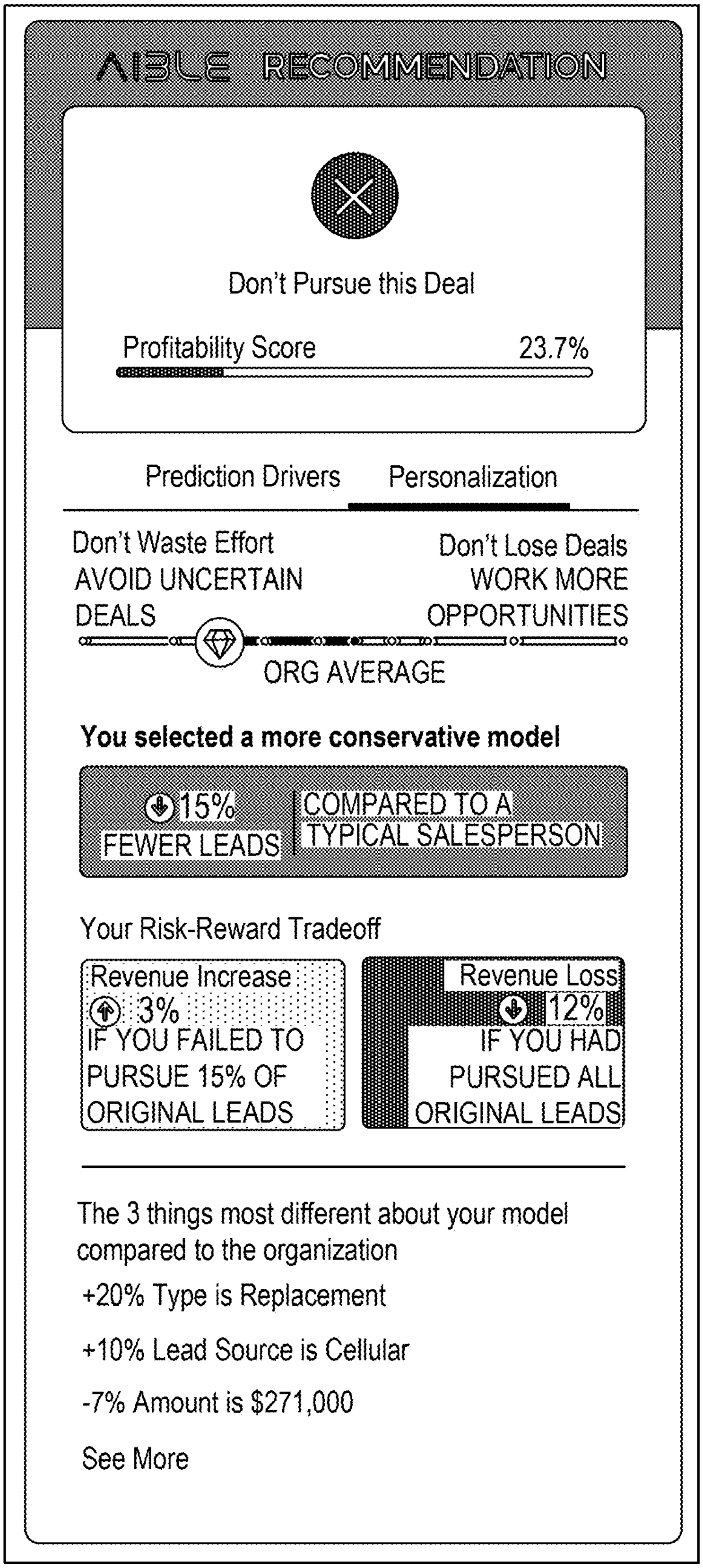
Figure 10:
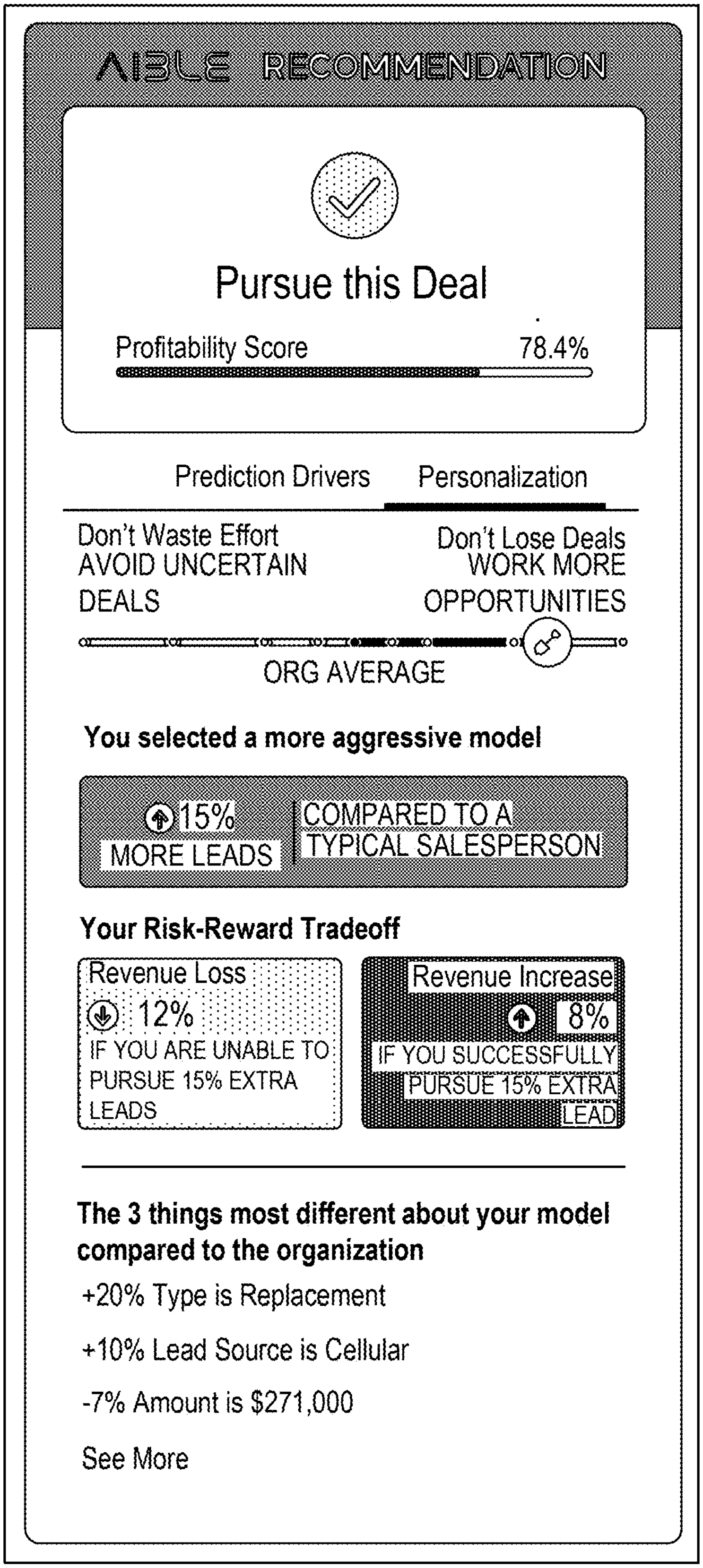
Figure 11:
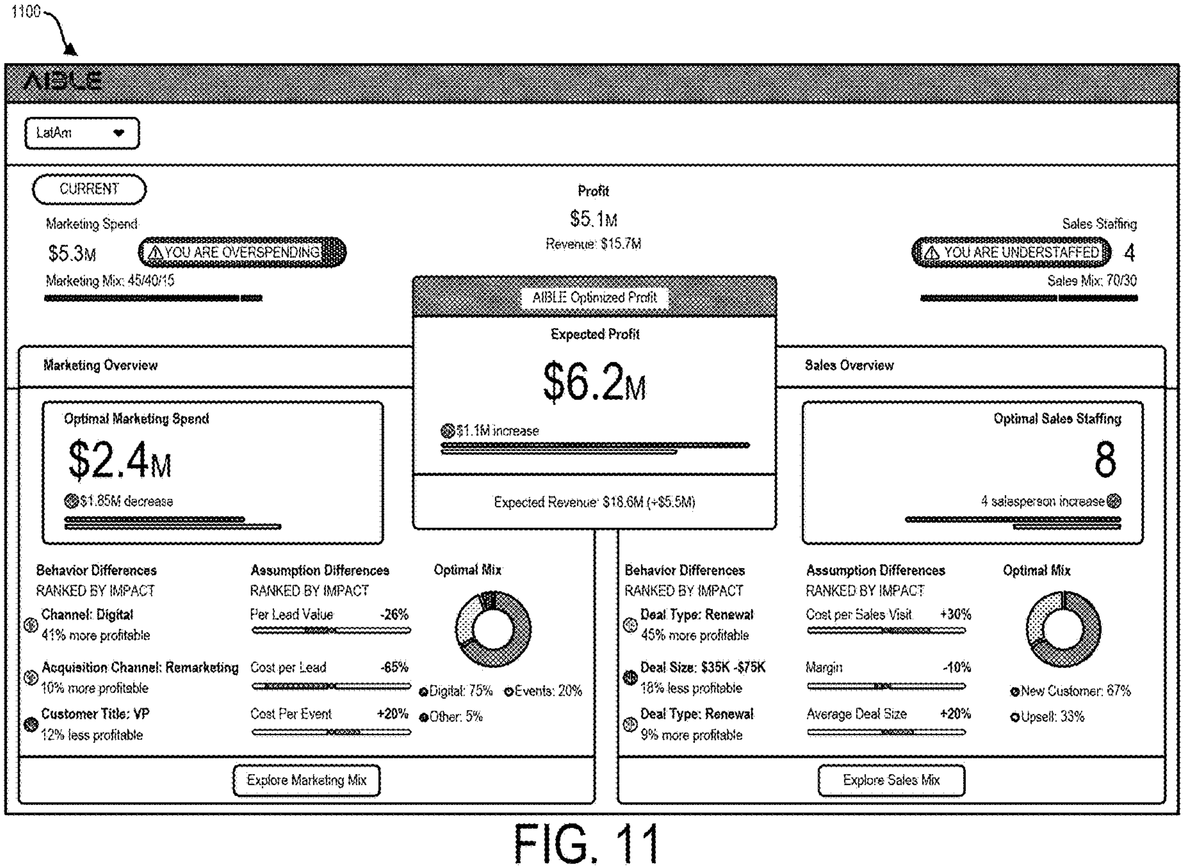
Figure 12:
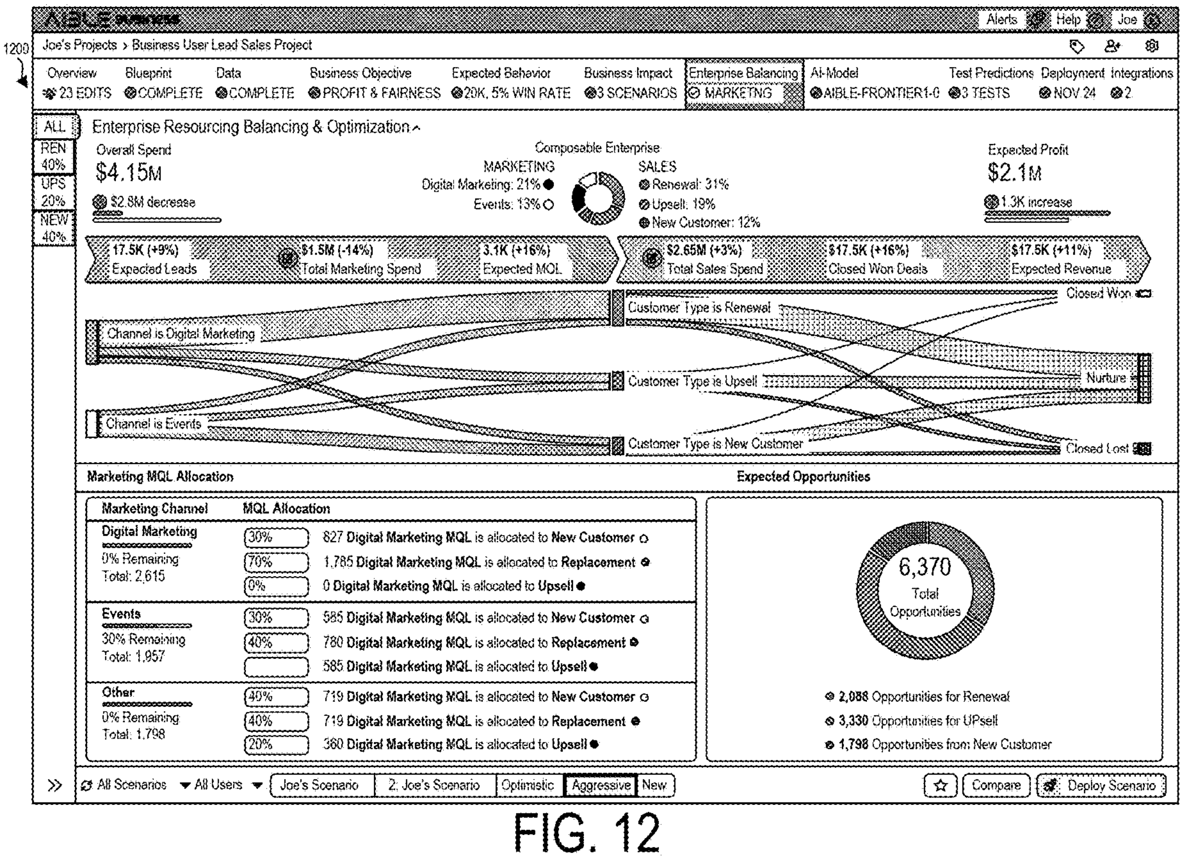
FIGS. 12-14 illustrate another example user interface illustrating example implementations of the current subject matter.
Figure 13:
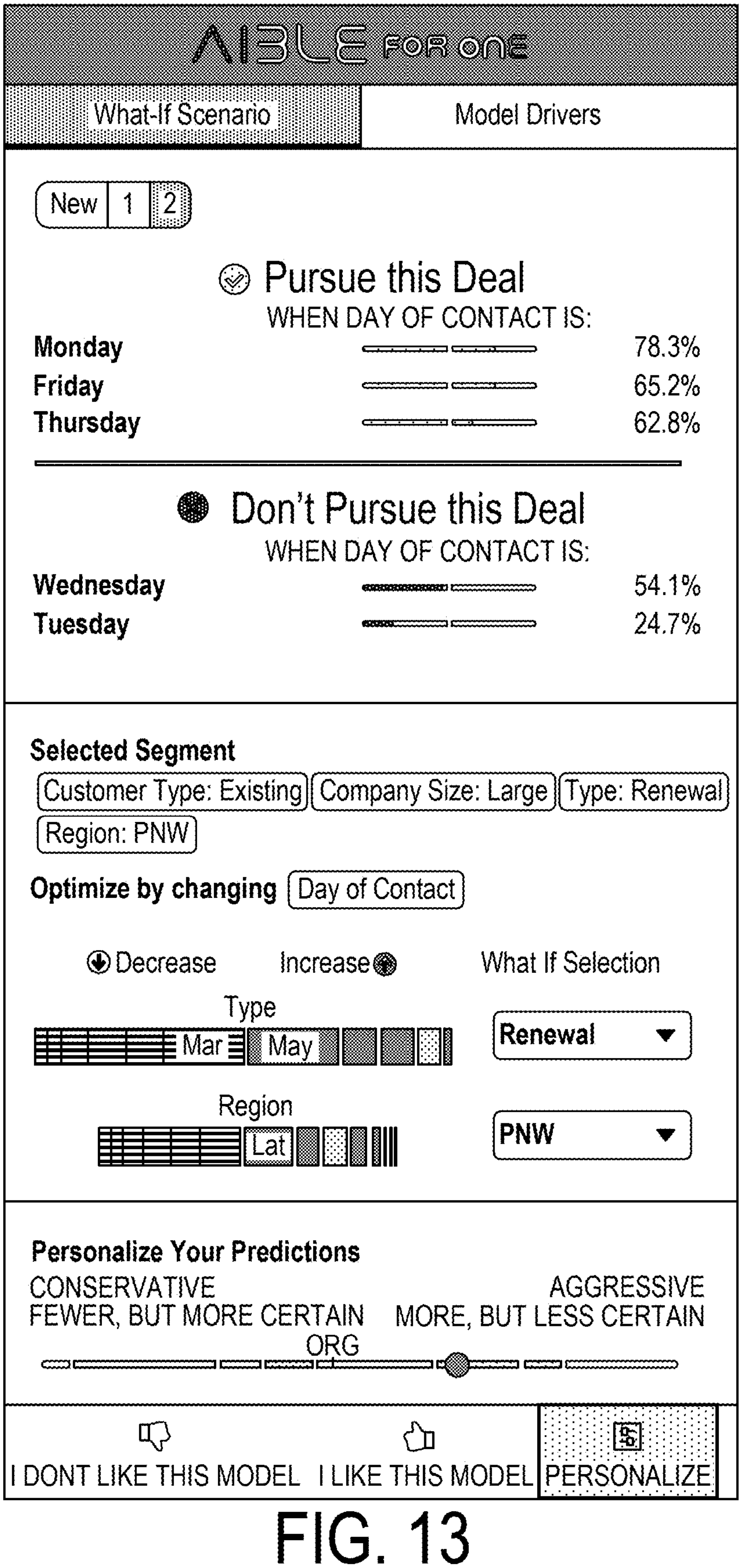
Figure 14:
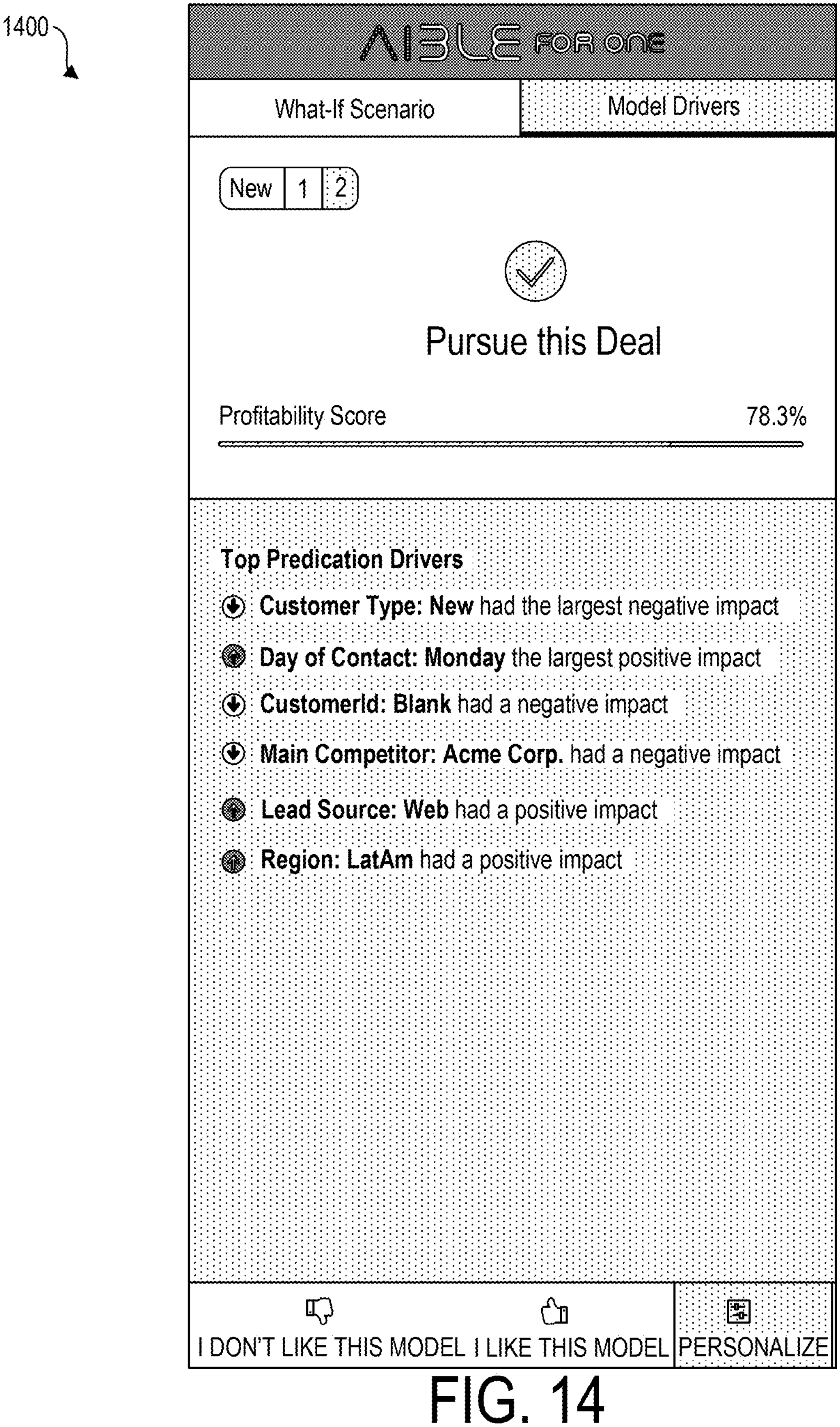

In some implementations, for a given set of models and a given constraints associated with these models, one model ("efficient model") can be trained or deployed. FIG. 6 illustrates an exemplary efficient frontier plot. The models that do not fall on the efficient frontier plot (or within a predetermined distance to the efficient frontier plot), may not be optimal and therefore not deployed.

The global constraints can be constraints that are applicable to multiple organizations in the business operation. For example, a business operation can include a marketing department and a sales department, each of which have their sets of models. It can be desirable to impose global constraints that apply on both the marketing and the sales department (e.g., total number of employees, combined budget, and the like).

Global constraints can include upper limits that the organization can support, or they can come from the market. A global business constraint can be the total possible budget for sales and marketing. For example, if an organization can only spend $5 million per year on sales and marketing, that is the upper cost limit. As another example, if a company can only produce ten thousand units from a market perspective, or if there are limits to the total population, the total production from the market perspective or the total population can be set as global constraint. In another example, if one is selling software to monitor light rail systems in North America, there may be about 50 light rail systems in North America, which can be the global constraint (e.g. potential customers).

Returning back to FIG. 1, at 130, performance of the one or more of second set of models can be assessed. The assessment can be based on a second output (or a second plurality of outputs) of the second set of models. Performance metrics can include not only accuracy, but any suitable metric including impact, which is described in more detail below. By training the first set of models and the second set of models across a range of resource levels, two feasible regions are created. Thus, during model deployment, should one (or both) resource levels change, the optimal models for the new resource level will be available for use in deployment. In other words, given a constraint, the model most appropriate for the given constraint can be selected and deployed to perform predictions under the given constraint without having to retrain (or newly train) a model. In an alternate implementation, a set of models appropriate for different population or budget constraints may be deployed and only the appropriate model from the portfolio is used for prediction and depending on the then current business realities (e.g., the current constraints and/or resource levels, and the like).

At 140, the first set of models (or a subset thereof) can be retrained based on one or more of the global constraint, information associated with the assessment of the second set of models and/or the second output, the first set of resource levels, and training data associated with the first set of models. In some implementations, optimal models can be selected for two or more efficient frontiers (e.g., associated with two or more sets of models). Each independent efficient frontier can have its own maximum (e.g., sales maximum) based on its set of constraints. For example, the maximum for sales department may consider the value of a deal, the cost of sales inputs, and the sales constraints. This can result in the selection of a desirable (e.g., optimal) model for the efficient frontier. However, sales may not be the only cost associated with winning a new opportunity. There may also be marketing efficient frontier that can independently considers the value of a lead, the cost of marketing inputs, and the marketing constraints to find the marketing maximum. If the sales and the marketing models are developed independently, there may be a disconnect between sales and marketing. If the marketing maximum recommends increasing the marketing budget by 50%, but no capacity is added in sales, sales may not be able to use all of the leads because they do not have the capacity to resource them. It can be desirable that the marketing and the sales frontiers are balanced. This can result in a global or universal maximum by considering the full cost across sales and marketing, and the constraints of each.

The retrained first set of models can generate a revised first output. Based on the revised first output, the second output, a combined performance of the first and the second set of models can be assessed. For example, the combined performance can be indicative of the performance of the entire business operation (e.g., a business operation that includes both the marketing department and the sales department). The feedback loop of providing the output of the second set of models and/or user input to the first set of models may be terminated when a global maximum is achieved. For example, when an impact factor calculated from the first and the second set of models is maximized. The global maximum can indicate that the sales and marketing efficient frontiers are balanced.

In some implementations, a global feasible performance region can be determined. The determination of the global feasible performance region can be based on the combined performance, the global feasible performance region, and the like. In one implementation, feasible performance regions of the first and the second set of models can be stacked by linking the output of the first set of models with the input of the second set of models. For example, output of marketing models can be linked to the input of sales models, which can couple the feasible performance regions of the sales and the marketing models.

In one implementation, a marketing efficient frontier can receive 10,000 possible contacts as an input and can generate 2,000 leads for the sales efficient frontier as output ("marketing global max"). The input to the sales efficient frontier can be 2,000 possible opportunities from the 2,000 marketing leads. Assuming that the sales global max is unconstrained and recommends pursuing a subset of the marketing leads (e.g., 1000 of the 2000 marketing leads) and a portion of pursued subset of marketing leads can be converted to won deals (e.g., 300 of the 1000 marketing leads). Alternately, there can be constraints on the sales global max (e.g., the sales team can only pursue 500 leads due to capacity constraints). The sales efficient frontier can select (or determine) constrained sales global max based on the marketing input. This may result in squandering of marketing resources, and overall impact can be lower due to excessive marketing costs.

The sales frontiers and marketing frontiers can be balanced by feeding the sales constraint back to the marketing frontier and the marketing frontier can then select a model that pursues fewer contacts and balances based on the sales capacity. This iterative approach can balance the resourcing levels to maximize impact. This can result in a coupled sales-marketing frontier (or a global feasible performance region) that can adjust to changes in market conditions without retraining the models. The global feasible performance region can be displayed on a graphical user interface (GUI) display space on a display device.

In some implementations, the current subject matter can enable for detecting, during model deployment, whether a given model performance is degrading over time or whether there are global changes (e.g., in the underlying data). Based on this information, the training/retraining of the first and the second set of models can be triggered. Such an implementation can provide for a monitoring functionality that can detect the impact of macroeconomic shocks and advise retraining an entire global feasible performance region (e.g., sometimes referred to as an efficient frontier) rather than just a single model (e.g., a single model of a set of models of a given department).

In some implementations, changes (e.g., global changes) may not be abrupt (e.g., without the presence of a shock). In such cases, the frontiers can continue to rebalance and resourcing can be shifted over time. Under these relatively stable conditions, certain models can still degrade over time due to data or behavioral changes. For example, if a given model used customer vertical name as a strong predictor, and the vertical naming convention changed, then the performance of that model can degrade. The model may determine that certain features are important for one section of the frontier and not as important for another section. Different models can be compared and the models that did not use customer vertical and are still performing well can be determined. This can allow for the determination that customer vertical led to degradation of the model(s) not a global shock (e.g., macroeconomic shock.) If all models drop in performance then it can be due to a shock or abrupt change. For example, in a model for US soybean sales to China, the efficient frontier would capture different cost benefit tradeoffs of cost to produce vs. market price. If a trade war with china were to begin, all models in the efficient frontier may degrade significantly. The drop in performance could relate to all variables and combinations of variables, making it clear that this is due to a shock.

In some implementations, frontiers can be stacked within a given practice or department (e.g., sales department, marketing department, etc.). For example, using efficient frontiers within marketing, pay per click, direct marketing & trade shows, etc., a global resource constraint can be allocated (e.g., for each $1 invested the same amount for pay per click, direct marketing, & trade shows is returned). Because the efficient frontier can evaluate the cost benefit tradeoffs, the ratio of value per action or cost per action can be set to be equal across all marketing types. This can allow for the determination of the amount of spend allocated to each function and the economic maximum (e.g., if the economic maximum is less than the constraint). For example, if there is the option to win a new customer, or increase the spend of one of my existing customers, these actions will have different values and costs, and there will be diminishing returns as a result of either action.

As an example, and with reference to the table below, the scenario starts unbalanced, where a given business is focusing too heavily on new customers. The business only receives $5 for every $1 spent (e.g., a 5:1 ratio), and the business spending less effort on upsell that provides $10 for every $1 spent (10:1 ratio). In shifting to a balanced scenario, the business average revenue for new customers increases $2,500 to $3,000 as the business is focusing on higher quality deals, and the average revenue for upsell drops from $1,000 to $600. However, the ratios are balanced, $1 spent on either customer group returns $6, and overall profit has increased. Also, total cost is unchanged as $46k reflects the sales capacity.

balanced to determine the mix of deals preferred by the sales team. By balancing marketing with sales, the efficient frontier for pay per click advertising in healthcare would reduce spending, and the efficient frontier for automotive would shift to increase spending.

In some implementations, personnel in one department (e.g., sales) can interact with the efficient frontier by indicating that they want to see more or fewer leads or fewer leads (e.g., "missing individual balancing"). This may result in the deployment of the next most conservative or aggressive model in the efficient frontier. The personnel may be able to manage their preferences such that they receive the level of leads that fits their desired input (e.g., of the set of models associated with sales). For example, if a person is traveling and is unable to support their normal level of leads, they can elect to temporarily restrict incoming leads to only the best leads. This will shift them to a more conservative model from the frontier.

In some implementations, the constraints or the resource levels of the models can be dynamically changed. For example, if the model constraints were set expecting each sales person to work 100 leads a month, but the sales persons were to reduce their desired input levels such that the

| | Customer Type | Customers Contacted | Cost per Customer | Revenue per Customer | Total Cost | Total Revenue | Profit | Ratio:1 |
|---|---|---|---|---|---|---|---|---|
| Unbalanced | New | 90 | $ 500 | $ 2,500 | $45,000 | $225,000 | $180,000 | 5 |
| | Upsell | 10 | $ 100 | $ 1,000 | $ 1,000 | $ 10,000 | $ 9,000 | 10 |
| | Total | | | | $46,000 | $235,000 | $189,000 | 5.11 |
| Balanced | New | 80 | $ 500 | $ 3,000 | $40,000 | $240,000 | $200,000 | 6 |
| | Upsell | 60 | $ 100 | $ 600 | $ 6,000 | $ 36,000 | $ 30,000 | 6 |
| | Total | | | | $46,000 | $276,000 | $230,000 | 6 |

In some implementations, the frontiers can be nested to create a universal max for an organization with stacked and sequential frontiers representing different regions, functions, products, and the like. This can allow for the top down or bottoms up development of many different efficient frontiers split over many independently balanced subgroups. For example, if each country has independent sales resources for OEM customers and end users (e.g., Germany OEM, Germany End User, UK OEM, UK End User), a different sales frontier for each country and sales function may be desirable.

In another implementation, marketing pay per click may span all of European Union (EU) while direct marketing can be country based. Pay per click may have one frontier for all of Europe that can balance to the sales resources from all countries, and direct marketing can have efficient frontiers for each country. However, with the marketing budget set for EU the marketing frontiers may have to balance within the EU marketing budget. For example, marketing budget of EU (e.g., within marketing allocated resources by type/region) can be balanced with sales (e.g., in PPC EU, Direct UK, Direct DE, etc.). In another example, sales resources of EU (e.g., within sales allocated resources by function & region) can be balanced with marketing (e.g., Germany OEM, Germany End User, UK OEM, UK End User, etc.).

In some implementations, feedback from the personnel can include information beyond a desire to see more or less as it relates to overall capacity. In some implementations, individual personnel can indicate that they want to see fewer deals related to healthcare, but want to see more deals related to automotive. This feedback can be aggregated and average leads per month drops to 60 per person, the marketing spend to balance the input to the actual desired capacity of the sales team can be reduced. This can be referred to as individual bottom build and balancing.

In some implementations, the efficient frontier can include a set of models where each model in the set is the optimal model for a given resource level or constraint. Models that are optimal for lower resource levels can be optimal where resources are limited whereas models that are optimal for higher resource levels can be optimal where resources are not so limited. In some implementations, in the scenario where resources are not so limited, the models that are optimal for the higher resource level may not be initially used on a given input data (e.g., population). Instead the models that are optimal at lower resource levels may be utilized with the initial portion of the input population. As increasing records of the input data (e.g., population) are processed, the models (or model) that is used to process the input can change to different models, specifically those models that are optimal for higher resource levels as they perform better the deeper into the population the processing is performed. In other words, as more records are processed, the models selected to process a given record can change such that earlier records are processed by models that are optimal for lower resource levels and later records are processed by models that are optimal for higher resource levels. In other words, for a given series of records, a best model along the efficient frontier would handle predictions until it is overtaken by another model, moving along the efficient frontier.

Training Models for an Organization Based on Organizational Constraints

Some implementations of the current subject matter can train and assess multiple models with multiple different constraints on the input parameters. And the multiple models can be treated as a single model. For example, each model can be trained with each of the different constraints on a given input parameter and the performance of each model can be assessed under each of the different constraints. The assessment of the performance of the models can be provided in a visualization illustrating a feasible performance region of the models. For example, the feasible performance region can include a boundary representing, for the set of models trained under the different constraints, predictions as a function of the given constrained parameter and an indication of the model that produced a given prediction. Given a constraint, the model most appropriate for the given constraint can be selected and deployed to perform predictions under the given constraint.

Accordingly, some implementations of the current subject matter can provide improved predictions by training and assessing multiple models under different constraints and providing an intuitive representation of the models and their performance under the different constraints. By training and assessing multiple models under different constraints and providing an intuitive representation of the performance of the models under the different constraints, the model most appropriate for a given operational constraint can be selected and deployed. As such, some implementations of the current subject matter can efficiently train, assess, and deploy models. By efficiently training, assessing, and deploying models, some implementations of the current subject matter can provide more appropriate predictions and can save computational resources, production time, and production costs.

Figure 2:
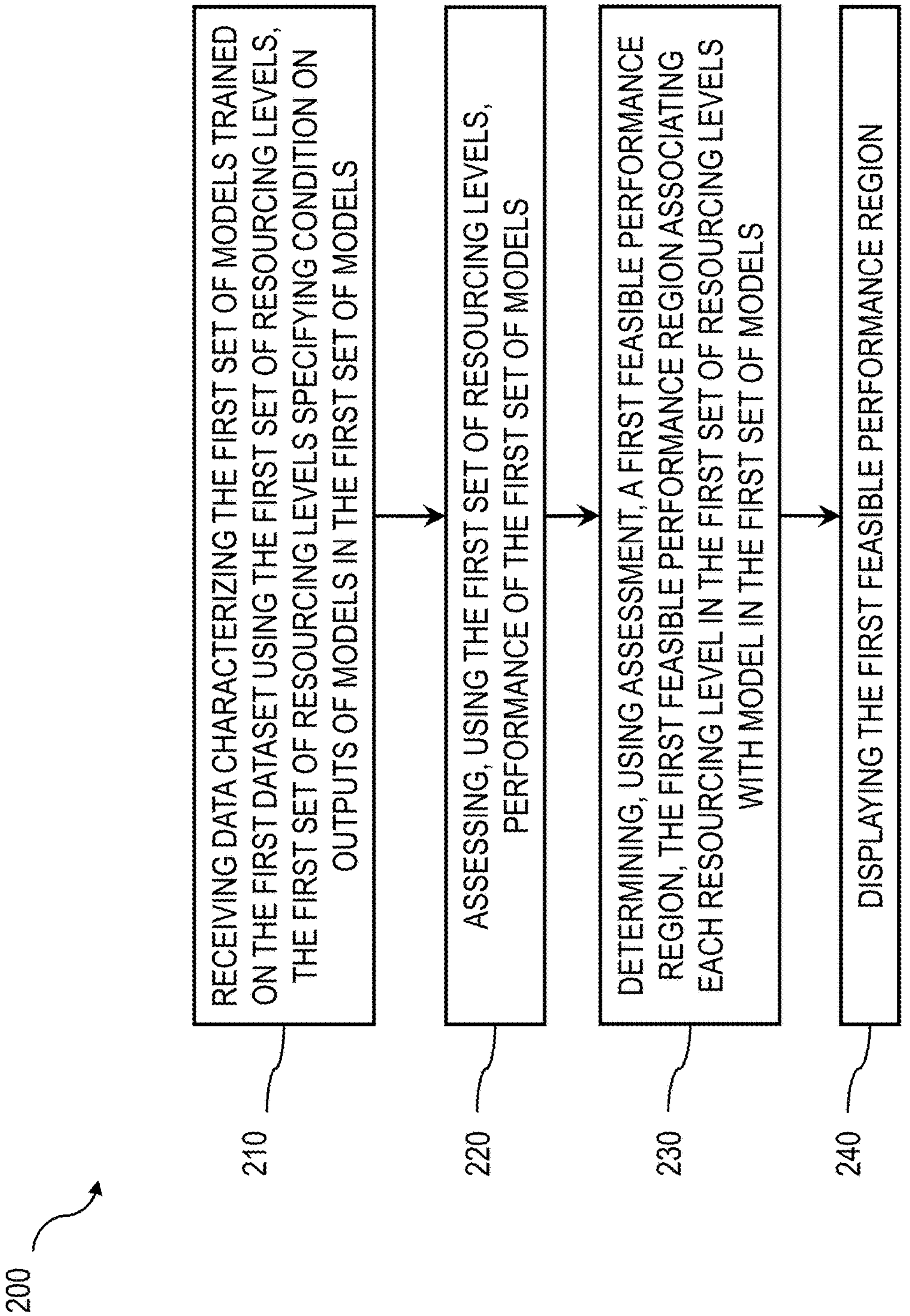
FIG. 2 is a process flow diagram illustrating an example process enabling the assessment of the performance of multiple models trained under different constraints.

FIG. 2 is a process flow diagram 200 illustrating an example implementation of assessing the performance of multiple models under multiple different constraints and providing an intuitive representation of the performance of the models under the different constraints. By assessing multiple models under multiple different constraints and providing an intuitive representation of the performance of the models under the different constraints, the model most appropriate for a given operational constraint can be selected and deployed. As such, the performance of the models can be improved and computational resources, production time, and production costs can be saved.

At 210, data characterizing a set of models, $M=\{M_1, \ldots, M_k\}$ (where $M_i \in M$ is a model), trained using a set of resourcing levels (e.g., constraints and/or the like), $C=\{c_1, \ldots, c_p\}$ (where $c_i \in C$ is a constraint) can be received. In some cases, the set of models can be represented as an ensemble model. An ensemble model can allow for interaction with the set of models by interacting with the ensemble model. For example, providing an input data entry $x^{(j)}$ from a dataset $D_n=\{x^{(1)}, \ldots, x^{(n)}\}$, where n is the number of variables (e.g., columns and/or the like) associated with respective entries in the dataset and j=1, n, to an ensemble model M including a set of models $\{M_1, \ldots, M_k\}$ can be the equivalent of providing the data entry as input to each model in the set of models (e.g., $M(x^{(j)})=\{M_i(x^{(j)}), \ldots, M_k(x^{(j)})\}$). The set of constraints can specify a condition on a variable of the models. Each model (e.g., submodel and/or the like) in the set of models (e.g., ensemble model) can be trained using at least one constraint in the set of constraints. For example, the specified condition on the variable of the model can limit the space of possible solutions provided by the set of models. For example, for a given input $$x^{(j)} = (x_1^{(j)}, \ldots, x_d^{(j)}),$$

where $x^{(j)} \in R^d$ is a d-dimensional vector, each model can provide an output, such as a classification, $$M_i(x^{(j)}) = y_i^{(j)}(\text{where } y_i^{(j)} \in \{\text{positive, negative}\}$$

$\in$ {positive, negative} corresponds to a "positive" (e.g., a classification as a positive class) or a "negative" (e.g., a classification as a negative class)). As will be discussed in detail below, a constraint can, for example, constrain a value of a variable in an entry of a dataset used to train the set of models.

In some cases, the output can specify what is being tested for, such as an input in a medical classifier being classified in the positive class as a tumor or the negative class as not a tumor or an input to an email classifier being classified in the positive class as a spam email or the negative class as not a spam email. In some cases, the specified constraint can limit the number of "positive" classifications output by a model, the number of "negative" classifications output by a model, and/or the like. For example, if the variable includes capacity and the constraint specifies a condition on capacity, such as a maximum possible capacity, the aggregate number of "positive" classes provided by each model can be below the capacity constraint. For example, in a hospital admissions classifier (e.g., model and/or the like), the constraint can include the number of beds available to patients in the hospital, where a single patient can occupy a bed. The variable can include the number of currently admitted patients and a new patient can be classified in the positive class, to be admitted, or in the negative class, not to be admitted. But based on the constraint on the variable, the number of admitted patients cannot exceed the number of hospital beds. If, for example, the number of patients equals the number of hospital beds, currently admitted lower risk patients can be released early to free up beds for new patients with a risk greater than the lower risk patients.

At 220, the performance of the set of models can be assessed. For example, each class provided by a classifier can include an indication of whether the classification was a true classification (e.g., a true positive TP, a true negative TN, and/or the like) or a false classification (e.g., a false positive FP, a false negative FN, and/or the like). Each classification (e.g., true classification, false classification, and/or the like) can be associated with a value. For example, a "true positive" can be associated with a value $TP_v$, a "true negative" can be associated with a value $TN_v$, a "false positive" can be associated with a value $FP_v$, and a "false negative" can be associated with a value $FN_v$. When given a set of inputs, the set of models can provide a classification for each input. For example, given a set of inputs $\{x^{(1)}, \ldots, x^n\}$ and an ensemble model (e.g., a set of constrained models and/or the like) $M=\{M_1, \ldots, M_k\}$, each constrained model $M_i$ can provide a set of predictions $$Y_i = \{y_i^{(1)}, \ldots, y_i^{(n)}\}$$

such that the set of constrained models M provides a set of sets of predictions, $$M(\{x^{(1)}, \ldots, x^{(n)}\}) = \{M_1(\{x^{(1)}, \ldots, x^{(n)}\}), \ldots, M_k(\{x^{(1)}, \ldots, x^{(n)}\})\} = \{Y_1, \ldots, Y_k\} = \{\{y_1^{(1)}, \ldots, y_1^{(n)}\}, \ldots, \{y_1^{(n)}, \ldots, y_k^{(n)}\}\}.$$

For example, as discussed above, each prediction $$y_i^{(j)}$$

can include an indication whether the input $x^{(i)}$ was correctly classified by model $M_i$ (e.g., a "true") or incorrectly classified by model $M_i$ (e.g., a "false"). The predictions can be aggregated over $i \in \{1, \ldots, k\}$ and $j \in \{1, \ldots, n\}$. The aggregated predictions can include, for example, a count of "true positives" $TP_c$, a count of "true negatives" $TN_c$, a count of "false positives" $FP_c$, and a count of "false negatives" $FN_c$. For example, a constraint can provide a condition on one or more of $TP_c$, $TN_c$, $FP_c$, $FN_c$, and/or the like.

In some cases, the frequency with which a model was correct when predicting the "positive" class, or precision $$\left(e.g., \text{Precision} = \frac{TP_c}{TP_c + FP_c|}\right),$$

can be used to assess the performance of the model. In some cases, the number of "positive" labels correctly identified by the model, or recall $$\left(e.g., \text{Recall} = \frac{TP_c}{TP_c + FN_c}\right),$$

can be used to assess the performance of the model. In some cases, the fraction of predictions that the model correctly predicted, or accuracy $$\left(e.g., Accuracy = \frac{TP_c + TN_c}{TP_c + TN_c + FP_c + FN_c}\right),$$

can be used to assess the performance of the model. But, assessing the performance of a model by optimizing on these metrics may not necessarily provide the best model for a given set of constraints. For example, in some cases, it can be desirable to assess the performance of the models by determining functions such as impact (e.g., $\text{Impact}=TP_c \cdot TP_v + TN_c \cdot TN_v + FP_c \cdot FP_v + FP_c \cdot FP_v$). In some cases, impact can include the aggregation over classifications of the count of classifications weighted by the value of respective classifications. In some cases, custom training and evaluation functions or metrics other than precision, recall, accuracy, loss, and/or impact can be used, including, for example, custom optimization functions. In some cases, a set of custom optimization functions can be used to generate the set of models. In some cases, a set of custom optimization functions can be used to assess the performance of the set of models by evaluating, for a given input data entry and/or set of constraints specifying a condition on a variable of the input data entry, respective outputs provided by the sets of models.

Further to the boolean case described above (e.g., model $M_i$ outputting either "positive" or "negative" for a given input), some implementations of the current subject matter can include multivariate models $M_i$, such that the output of the model includes three or more possible output values. For example, given a model $M_i$, an input $x^{(j)}$, where $x^{(j)}$ can include an element of the dataset $D_n$, and an output dimension $d_o$, where $d_o \geq 3$, the model can output $$M_i(x^{(j)}) = y_i^{(j)}, \text{ where } y_i^{(j)} \in \{\text{class}_1, \ldots, \text{class}_{d_0}\}.$$

$\in \{\text{class}_1, \ldots, \text{class}_{d_o}\}$. For example, if $d_o=3$, then the output $$y_i^{(j)}$$

can include either $\text{class}_1$, $\text{class}_2$, or $\text{class}_3$. Then, the performance of each model $M_i \in M$ can be provided in a confusion matrix characterizing, for each possible output, a value of a respective output given a respective actual value. For example, when the output of model $M_i$ on input $x^{(j)}$ is $$y_i^{(j)}(\text{e.g., } M_i(x^{(j)}) = y_i^{(j)}),$$

the output can be compared with the actual value being predicted and the value $v_{st} \in R$ (e.g., $v_{st}$ can include a real number and/or the like) can be provided, where s can include the predicted class and t can include the actual (e.g., true and/or the like) value.

As illustrated in the confusion matrix below, the output $$y_i^{(j)}$$

of model $M_i$ on input $x^{(j)}$ can include $\text{class}_1$, $\text{class}_2$, or $\text{class}_3$. The actual value can include $\text{class}_1$, $\text{class}_2$, or $\text{class}_3$. When the output $$y_i^{(j)}$$

of model $M_i$ on input $x^{(j)}$ is $\text{class}_1$, the confusion matrix can include three different values characterizing the performance of the model. For example, when the output $$y_i^{(j)} = \text{class}_1$$

and the actual value is $\text{class}_1$ a value of $v_{11}$ can be obtained; when the output $$y_i^{(j)} = \text{class}_1$$

and the actual value is $class_2$ a value of $v_{12}$ can be obtained; and when the output $$y_i^{(j)} = \text{class}_1$$

and the actual value is $class_3$ a value of $v_{13}$ can be obtained.

confusion matrix actual $class_1$ $class_2$ $class_3$ $class_1$ $v_{11}$ $v_{12}$ $v_{13}$ $y_i^{(j)}$ $class_2$ $v_{21}$ $v_{22}$ $v_{23}$ $class_3$ $v_{31}$ $v_{32}$ $v_{33}$ To illustrate this example further, suppose the three classes are "red", "yellow", and "green", corresponding to a stoplight, and the problem includes predicting the color of the light by a self-driving car. Then $class_1$ can correspond to "red", $class_2$ can correspond to "yellow", and $class_3$ can correspond to "green". When a given model $M_i$ predicts the color of the stoplight as "red", the possible actual values can include "red", "yellow", and "green", and the confusion matrix can include a characterization of the performance of the model. For example, if the actual value is "red", then $v_{red,red}$ can be characterized as performing well. When the actual value is "yellow", then $v_{red,yellow}$ can be less than $v_{red,red}$, but not as low as $v_{red,green}$ when the actual value is "green", since a car stopping at a yellow light can be expected under ordinary driving conditions (e.g., the car being driven by a human), but a car stopping at a green light can be out of the ordinary. Similarly, a value characterizing the performance of the prediction can be provided for each pair of outputted class and respective actual value.

At 230, the feasible performance region can be determined using the assessment of the performance of the set of models ascertained at 220. For example, as described above, the performance of each model can be assessed. The assessment of performance can be used to determine which model $M_i$ can be used for different values of the constrained variable $$x_h^{(j)}, x^{(j)} = (x_1^{(j)}, \ldots, x_h^{(j)}, \ldots, x_d^{(j)}).$$

For example, model $M_i$ may provide optimal performance for a value of the constrained variable $$x_h^{(j)}$$

less than a first threshold $T_1$, model $M_2$ may provide optimal performance for a value of the constrained variable $$x_h^{(j)}$$

greater than the first threshold $T_1$ but less than a second threshold $T_2$, and model $M_3$ may provide optimal performance for a value of the constrained variable $$x_h^{(j)}$$

greater than the second threshold $T_2$. In some cases, the feasible performance region can be determined by interpolating between the accuracy of the generated models to define a region, border, and/or the like. For example, a metric (e.g., accuracy, recall, precision, impact, and/or the like) can be determined for each model in the generated set of models. The respective metrics can be discrete elements (e.g., points and/or the like) of the constraint space (e.g., the number line representing the constraint and/or the like). The respective discrete elements can be used to interpolate, for example, a continuous boundary and/or region. In some cases, the feasible performance region can be determined by bounding the optimal points in a range of possible constraint values for respective (e.g., every) model in the set of models.

At 240, the feasible performance region of the set of models as a function of the resourcing level can be displayed. As will be discussed below, the displayed feasible performance region can include a visualization of, for example, the model $M_i$ that provides optimal performance in a given interval of the resourcing variable, the value of the custom training and evaluation function or metric that is optimized by the model $M_i$, and/or the like.

Figure 3:
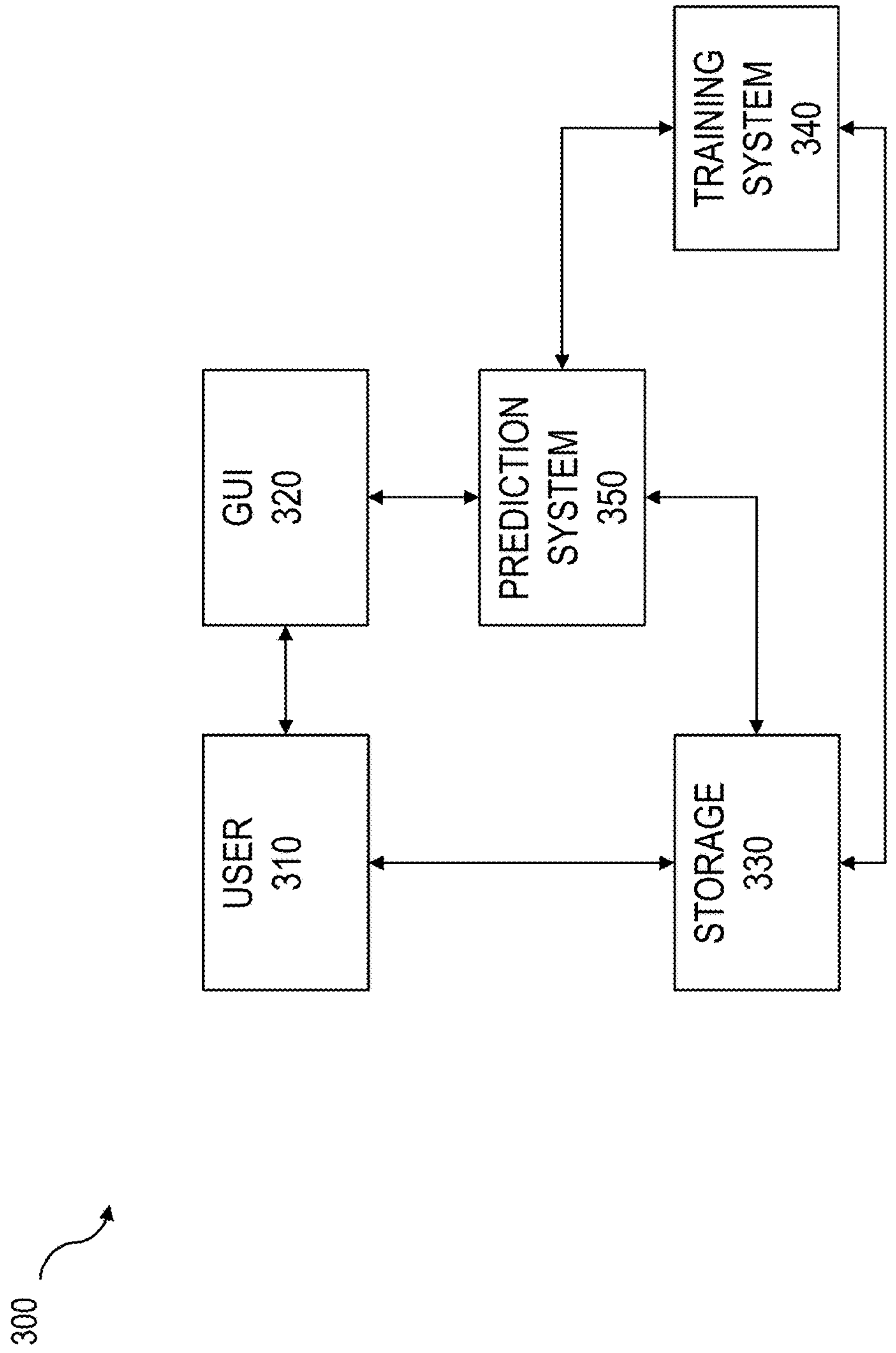
FIG. 3 is a system block diagram illustrating an example system enabling the training, assessing, and deployment of models trained under different constraints.

FIG. 3 is a system block diagram illustrating an example implementation of a system 300 for training, assessing, and deploying a set of resourcing models. System 300 can include graphical user interface (GUI) 320, storage 330, training system 340, and prediction system 350. By training and assessing multiple models under different resourcing levels and providing an intuitive representation of the performance of the models under the different resource constraints, the model most appropriate for a given operational constraint can be selected and deployed. As such, the performance of the models can be improved and computational resources, production time, and production costs can be saved.

GUI 320 can be configured to receive input from user 310. For example, the input can include a dataset $D_n=\{x^{(1)}, \ldots, x^{(n)}\}$ for training the set of models $M=\{M_1, \ldots, M_k\}$, where k is the number of models in the set of models. As another example, the input can include values $TP_v$, $TN_v$, $FP_v$, $FN_v$; counts $TP_c$, $TN_c$, $FP_c$, $FN_c$; and/or the like. As another example, the input can include constraints (e.g., a condition on a variable and/or the like)

$$c_{h,r}^{(j)} \text{ on variables } x_h^{(j)}$$

(e.g., columns and/or the like) of elements $x^{(j)}$ (e.g., rows and/or the like) of the dataset $D_n$, where, for example, $$x_h^{(j)} \in x^{(j)} = (x_1^{(j)}, \ldots, x_h^{(j)}, \ldots, x_d^{(j)}),$$

$x^{(j)} \in D_n$, where n is the number of entries (e.g., rows and/or the like) in the dataset, d is the dimension (e.g., number of columns and/or the like) of each dataset entry, j is an index indicating a value in the range {1, . . . , n} (e.g., an index pointing to a dataset entry and/or the like), h is an index indicating a value in the range {1, . . . , d} (e.g., an index pointing to a variable of a dataset entry and/or the like), and r is an index indicating a value in the range $$\{1, \ldots, \text{number of constraints on the varaible } x_h^{(j)}\}$$

(e.g., an index pointing to a constraint in the set of constraints on a variable and/or the like.

As another example, GUI 320 can be configured to receive user input specifying a training goal. For example, a training goal can include an indication of the output, performance, and/or the like of the set of models. For example, a set of models can be trained to optimize a first goal, such as optimizing impact; optimize a first goal given a second goal, such as optimizing growth given break even impact, optimize cash flow given minimum investment, and/or the like. In some implementations, the boundary of feasible performance can determine all possible optimal points for $M=\{M_1, \ldots, M_k\}$. Examples of such graphical user interfaces are illustrated in FIGS. 15-18 at 1500, 1600, 1700, and 1800.

Figure 15:
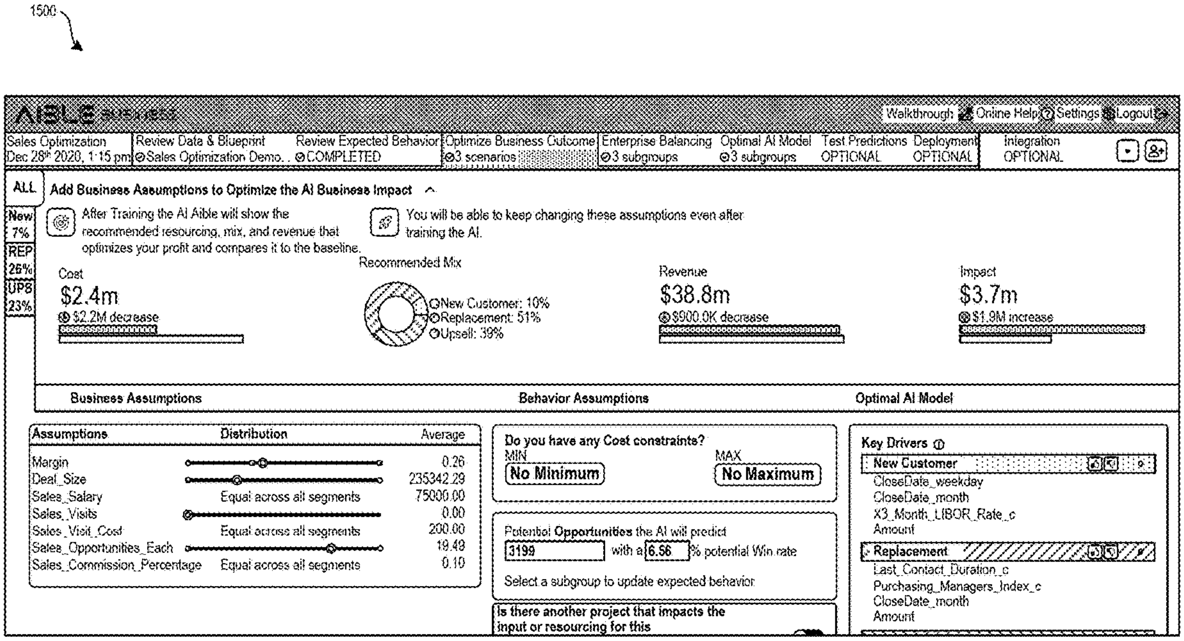
FIGS. 15-18 illustrate additional example user interfaces illustrating example implementations of the current subject matter.
Figure 16:
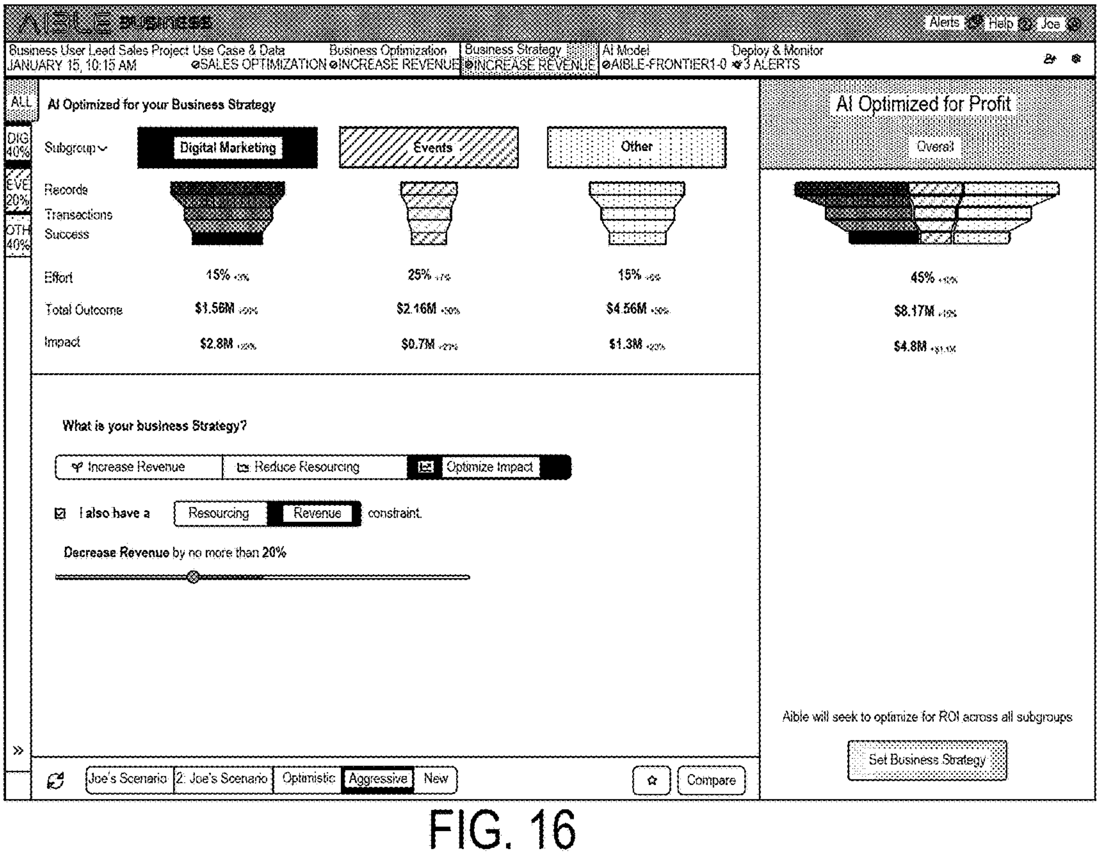

FIG. 15 illustrates an example GUI 1500 that allows for a user to specify an objective to maximize profit, and includes an option for the user to impose minimum and maximum resource constraints (e.g., cost). FIG. 16 illustrates an example GUI 1600 that allows users to set business strategies, for example, as illustrated a user has set a strategy to maximize profit without reducing revenue by more than 20%. In some implementations of the current subject matter, the revenue constraint is maintained by finding a minimum resource allocation (e.g., to a first organization) that returns 80% of the initial revenue and does not allow the allocation to drop below this level. In this example, the minimum resource number is automatically calculated to deliver the revenue limit.

Figure 17:
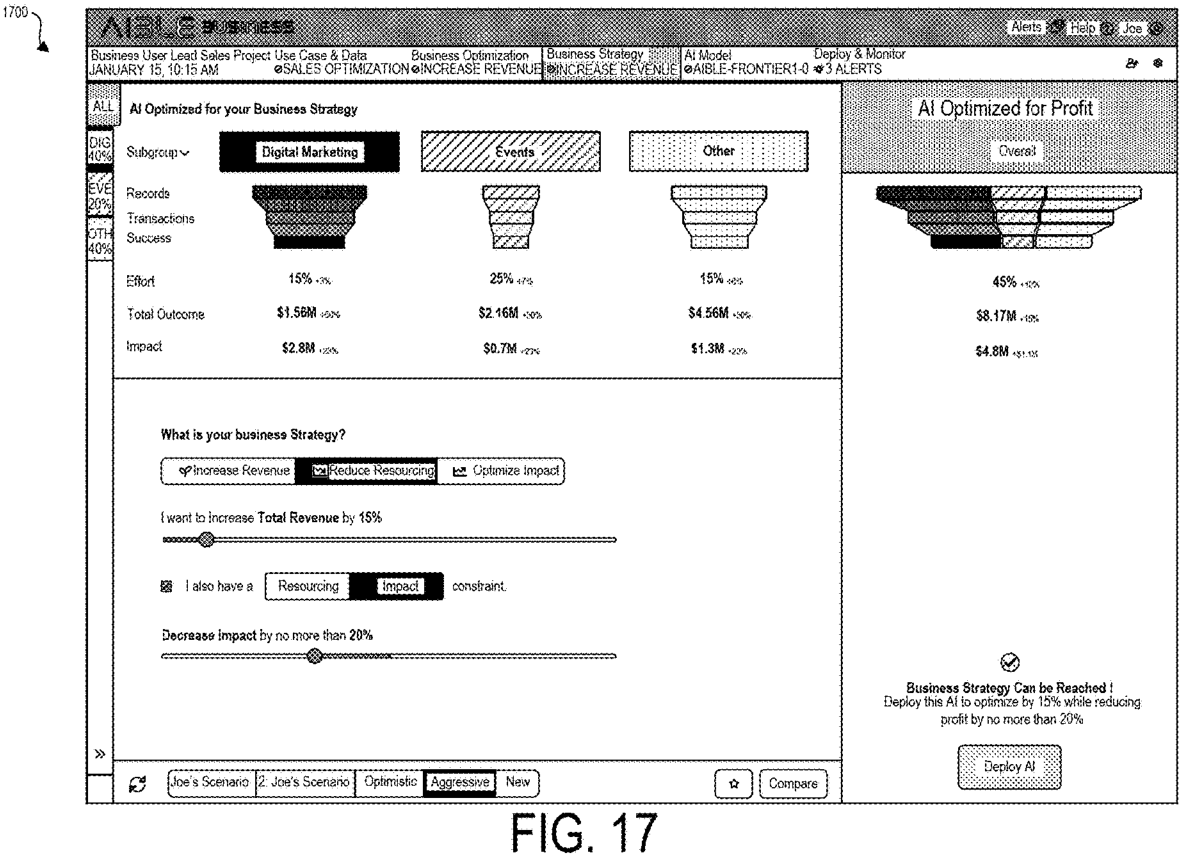

FIG. 17 illustrates an example GUI 1700 that allows a user to set a business strategy that attempts to increase revenue by 15% without reducing profit by more than 20%. To achieve this, some implementations of the current subject matter can determine or find the minimum resource allocation to achieve 15% revenue growth and the maximum resource allocation that would still retain 80% of profit. If the revenue target resource level is less than the profit limit resource level, a solution is feasible. If a solution is not feasible, the user can be informed that the strategy cannot be achieved.

Figure 18:
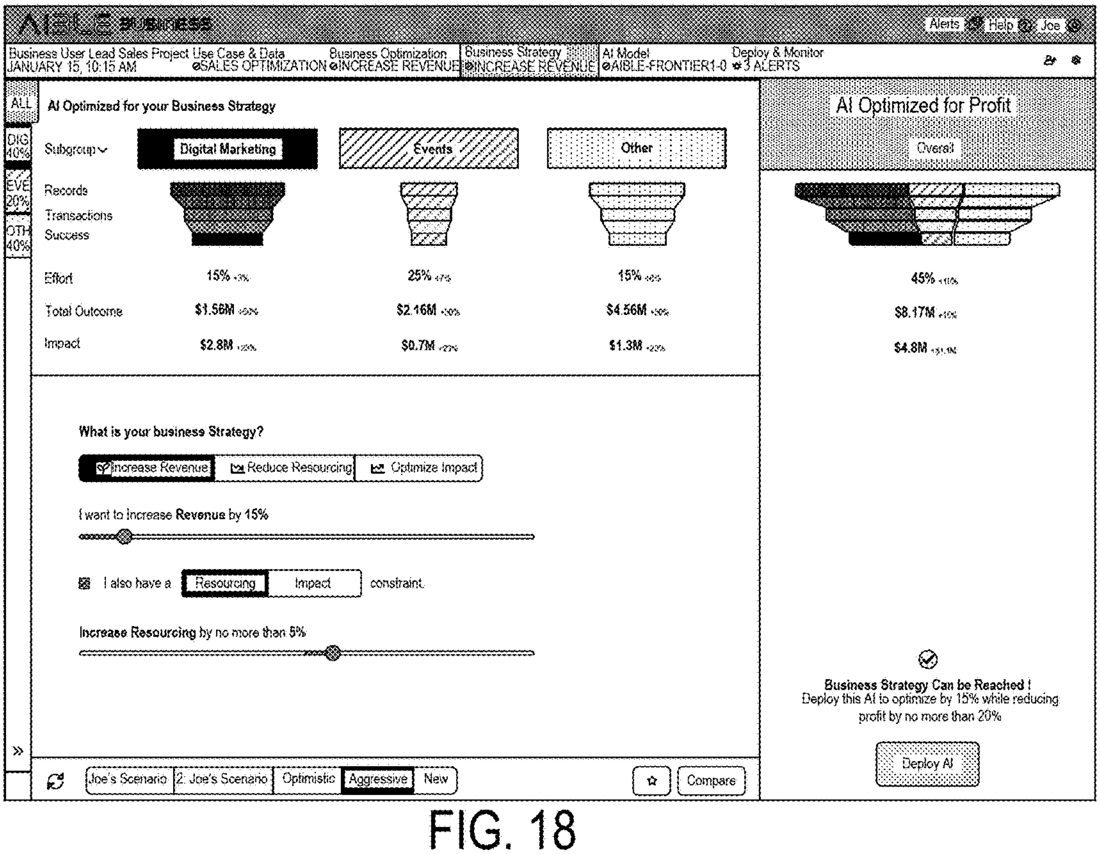

FIG. 18 illustrates an example GUI 1800 that allows a user to set a business strategy that attempts to increase revenue by 15%, without increasing resourcing by more than 5%. Some implementations of the current subject matter can find the minimum resource to achieve 15% revenue increase and if this is less than a 5% increase over current resource levels, a solution is feasible.

Referring again to FIG. 3, storage 330 can be configured to store (e.g., persist and/or the like), for example, inputs received from GUI 320 such as datasets $D_n=\{x^{(1)}, \ldots, x^{(n)}\}$; values $TP_v$, $TN_v$, $FP_v$, $FN_v$; counts $TP_c$, $TN_c$, $FP_c$, $FN_c$; constraints $$c_{h,r}^{(j)}$$

on variables $$x_h^{(j)};$$

and/or the like. As will be discussed below, storage 330 can be configured to store sets of trained models. And storage 330 can be configured to store, for example, the performance of the sets of models, assessments of the performance of the sets of models, and/or the like. Storage 330 can include, for example, repositories of data collected from one or more data sources, such as relational databases, non-relational databases, data warehouses, cloud databases, distributed databases, document stores, graph databases, operational databases, and/or the like. FIGS. 7-14 illustrate example GUIs 700, 800, 900, 1000, 1100, 1200, 1300, and 1400 according to some example implementations.

Training system 340 can be configured to train sets of models $M=\{M_1, \ldots, M_k\}$ on datasets, such as $D_n=\{x^{(1)}, \ldots, x^{(n)}\}$. Each model $M_i$ E M can be trained on the entries $x^{(j)}$ in the dataset $D_n$ using, for example, learning algorithms, such as principal component analysis, singular value decomposition, least squares and polynomial fitting, k-means clustering, logistic regression, support vector machines, neural networks, conditional random fields, decision trees, and/or the like. In some cases, the sets of models can be trained on constrained variables $$x_h^{(j)} \in x^{(j)},$$

$x^{(j)}$, where $x^{(j)} \in D_n$ and the constraint includes $$c_{h,r}^{(j)}.$$

In some cases, user input can be received specifying a new constraint value $$c_{h,r+1}^{(j)}$$

and a new model $M_{k+1}$ can be generated. For example, the new model $M_{k+1}$ can be trained on the new constraint $$c_{h,r+1}^{(j)}.$$

Prediction system 350 can be configured to assess the performance of sets of models, such as $M=\{M_1, \ldots, M_k\}$, and determine feasible performance regions. As will be discussed below with reference to FIG. 4 and FIG. 5, the feasible performance region can include a set of intervals $I=\{(a_1, a_2), \ldots, (a_{p-1}, a_p)\}$, where for a given interval $(a_i, a_{i+1}) \in I$, $a_i \in \{a_1, \ldots, a_{p-1}\}$ can include the start values of the intervals and $a_{i+1} \in \{a_2, \ldots, a_p\}$ can include the end values of the intervals, such that for each interval $(a_i, a_{i+1}) \in I$, a model $M_{(a_i,a_{i+1})} \in M$ can provide optimal performance in the given interval $(a_i, a_{i+1})$. The optimally performing model $M(a_i,a_{i+1})$, for example, can be associated with and used for values of the variable within the interval $$(\text{e.g., } x_h^{(j)} \in (a_i, a_{i+1})$$

$\in (a_i, a_{i+1})$ and/or the like).

Following the above example, for each data set entry $$x^{(j)} \in D_n$$

and for each value of a variable in each dataset entry $$(\text{e.g., } x_h^{(j)} \in x^{(j)}),$$

such that $$a_1 \le x_h^{(j)} \le a_p,$$

the performance of each model $M_i \in M$ can be assessed by determining the output of each model $M_i$ when given the variable $$x_h^{(j)}, (\text{e.g., } M_i(x_h^{(j)})$$

can be computed and/or the like). In some cases, the output of the model can include impact. After computing the output of each model $M_i \in M$ over the values of the variable $$x_h^{(j)}$$

in each interval $(a_i, a_{i+1}) \in I$, the feasible performance region can include the set of intervals $I=\{(a_1, a_2), \ldots, (a_{p-1}, a_p)\}$ and, for each interval $(a_i, a_{i+1})$, the associated model $M_{(a_i, a_{i+1})}=M_l$ such that $M_l$ can include the optimally performing model in the interval $(a_i, a_{i+1})$. For example, the feasible performance region can include a map of intervals $(a_i, a_{i+1})$ to models $M_{(a_i, a_{i+1})}$, such that Feasible Performance Region=$\{(a_1, a_2): M_{(a_1, a_2)}, (a_{p-1}, a_p): M_{(a_{p-1}, a_p)}\}$.

Figure 4:
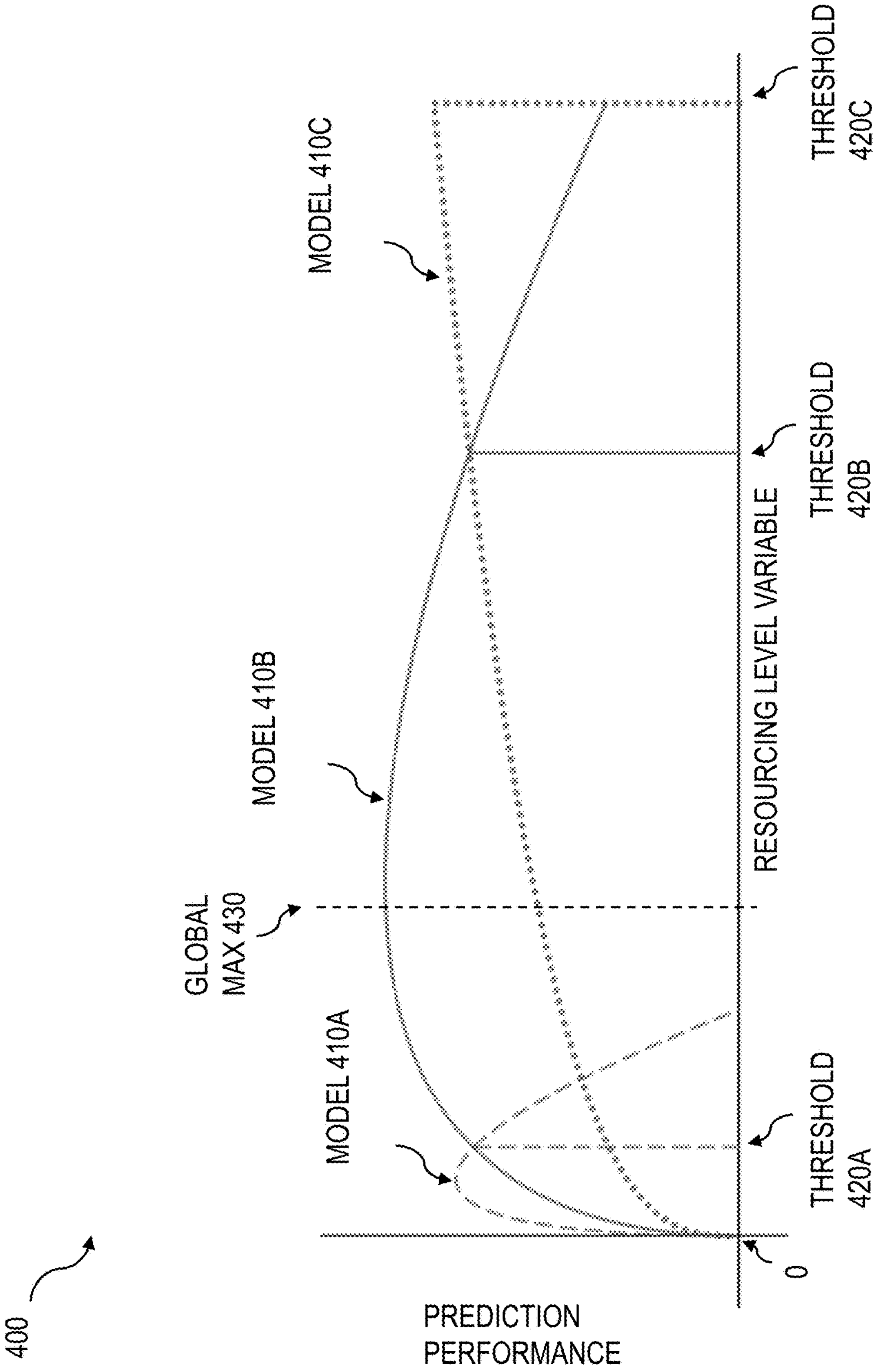
FIG. 4 is a diagram illustrating an example visualization of predictions provided by several models as a function of a constrained parameter.

FIG. 4 is a diagram illustrating an example visualization 400 of outputs provided by several models as a function of a resourcing variable. By training and assessing multiple models under different resourcing levels and providing an intuitive representation of the performance of the models under the different constraints, the model most appropriate for a given operational constraint can be selected and deployed. As such, the performance of the models can be improved and computational resources, production time, and production costs can be saved.

Figure 5:
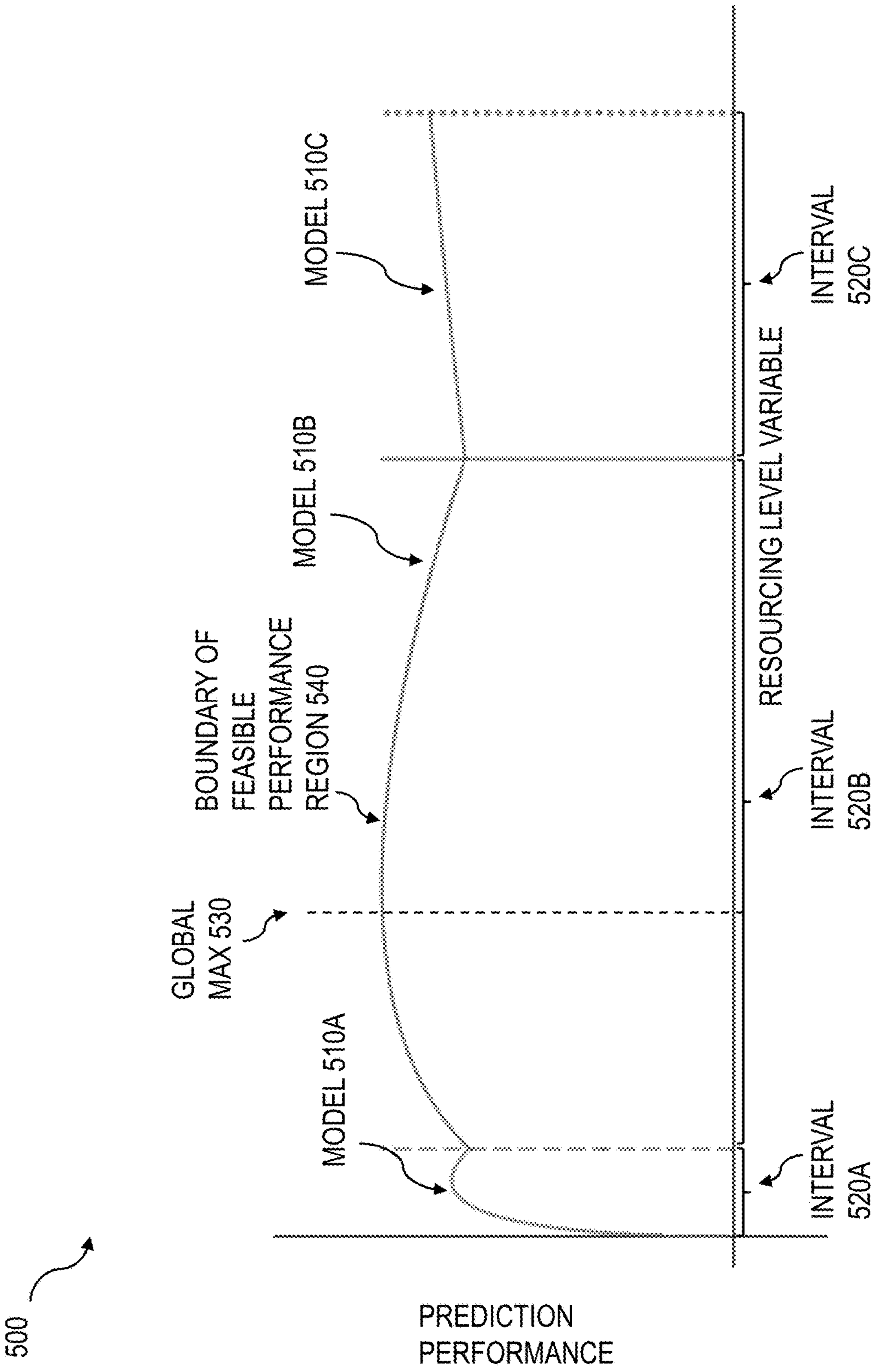
FIG. 5 is a diagram illustrating an example visual representation of a feasible performance region.

The visualization 400 can include, for example, a graph of performance as a function of the resourcing variable. In some cases, performance can include impact. The output of each model can be graphed. FIG. 4 illustrates the output of three models, model 410A, $M_A$, model 410B, $M_B$, and model 410C, $M_C$. As illustrated in FIG. 4, below threshold 420A the performance of model 410A is optimal, between threshold 420A and threshold 420B the performance of model 410B is optimal, and after threshold 420B the performance of model 410C is optimal. The intervals can be defined as $I=\{(a_1, a_2), (a_2, a_3), (a_3, a_4)\}$, where $a_1=0$, $a_2$=threshold 420A, $a_3$=threshold 420B, $a_4$=threshold 420C. Then, the feasible performance region can be Feasible Performance Region=$\{(a_1, a_2): M_A, (a_2, a_3): M_B, (a_3, a_4): M_C\}$ FIG. 5 is a diagram illustrating an example visual representation 500 of a feasible performance region. By training and assessing multiple models under different resourcing levels and providing an intuitive representation of the performance of the models under the different resourcing, the model most appropriate for a given operational constraint, business impact, or strategy can be selected and deployed. As such, the performance of the models can be improved and computational resources, production time, and production costs can be saved.

Visual representation 500 can include, for example, feasible performance region boundary 540. As described above with reference to FIG. 4, the feasible performance region can include, for example, interval 520A $(a_1, a_2)$ of resourcing associated with model 510A $M_A$, interval 520B $(a_2, a_3)$ of resourcing associated with model 520B $M_B$, and interval 520C $(a_3, a_4)$ of resourcing associated with model 510C $M_C$. Feasible performance region boundary 540 can easily represent the performance of a set of models, for example, over the entire domain of possible resource levels. To the user, feasible performance region boundary 540 can represent the performance of the set of models (e.g., $M=\{M_A, M_B, M_C\}$ and/or the like) and the set of models can be treated as a single model. As such, some implementations of the current subject matter can facilitate user interaction with a set of models $M=\{M_1, \ldots, M_k\}$ by treating the set of models as a single model M* (e.g., an ensemble model and/or the like). For example, with $M=\{M_A, M_B, M_C\}$, the interval $I=\{(a_1, a_2), (a_2, a_3), (a_3, a_4)\}$, and the feasible performance region $\{(a_1, a_2): M_A, (a_2, a_3): M_B, (a_3, a_4): M_C\}$, the single model M* can be defined piecewise such that, $$M^*(x_h^{(j)}) = \{M_A(x_h^{(j)}),\ a_1 \le x_h^{(j)} < a_2 M_B(x_h^{(j)}),\ a_2 \le x_h^{(j)} < a_3 M_C(x_h^{(j)}),\ \&\ a_3 \le x_h^{(j)} \le a_4$$

In some cases, the set of models can be tuned by a custom training and evaluation functions or metrics. For example, given an optimal impact optimization function, adjust the set of models with optimization functions representing, for example, constraint values less than optimal. For example, if the optimal impact can be achieved by doing manual quality inspections on 15% of units produced, the constrained models generated can represent constraints that limit inspections to less that the optimal 15% of the units produced. The range of optimization functions that will represent constrained conditions can be determined a priori, but the exact resourcing optimization point can be nondeterministic prior to model generation. The set of models can be assessed at several values within the constrained range. If the constraint is 8%, the set of models can include a model that can be optimized to run on an interval on either side of the constraint, for example one model may be optimized to 7% and another to 11%. The closest model can be used, or a search function can be executed running an additional set of models with optimization functions between the range of the 7% and 11% models to narrow in on the optimal settings for the 8% constraint.

Given a set of models, the feasible performance region can represent the highest model performance given, for example, any impact or capacity constraint. For example, given input such as cost or prices, regional differences in cost or prices could increase or decrease the optimal capacity (e.g., the constrained variable). In regions associated with a high cost, the optimal impact model can require less resources than in a region associated with a low cost. But, if all regions receive the same level of resources, the region associated with a low cost can be experiencing a constraint while the region associated with the high cost is operating at optimal impact. The feasible performance region can represent the optimal impact for a combination of inputs, such as costs and constraints, and can facilitate identifying, for example, strategic resourcing needs, optimal impact model utilization, and/or the like.

In some implementations, an ensemble model can be created. As described above, the ensemble model can include multiple models (e.g., submodels and/or the like). In some cases, the ensemble model can have better performance for a given goal than any of the submodels individually. For example, the multiple submodels can each be trained with respective constraints on a variable of the dataset, with the respective constraints can be from a set of constraints specifying a condition on the variable. When any of the submodels receive inputs with the value of the variable outside of the codomain of the respective constraints on the variable, the submodel can perform worse than, for example, a submodel trained with the respective constraint corresponding to the value of the variable in the input. The ensemble model can improve by, for example, selecting the submodel trained with the respective constraint corresponding to the value of the variable in the input.

Although a few variations have been described in detail above, other modifications or additions are possible. For example, in some implementations, in order to achieve optimal growth with breakeven impact, one would continue classifying as positive all deals until the sum of expected positive impact and the negative impact deals is 0. Once the global optimum is reached, negative expected value transactions can be pursued until the total impact from the positive expected value deals can be exhausted. In some implementations, the value of the constraints can be modified within an interval of possible values of the constraint. For example, on one end of the interval, the value of the constraint can facilitate positively classifying inputs that with a significantly high accuracy (e.g., over 90%) and on the other end of the interval, the value of the constraint can facilitate positively classifying any input. In some implementations, changing the optimization function may not change the trained model including a set of submodels $M=\{M_1, \ldots, M_k\}$.

The subject matter described herein provides many technical advantages. For example, developing an ensemble model bounded by the feasible performance region can define a continuum along which all optimization function local maxima can be represented. This continuum encompasses the spectrum of variation representative of variations and local maxima that exist in the real world use cases where these models can be deployed. As such, a plethora of optimization functions can utilize different points along the feasible performance region to provide customized predictions to an individual level. For example, a business can have production facilities servicing five separate geographical regions, each facility can have unique production capacity, labor and material costs, each region can have a unique strategy, demand, and pricing. Each combination of business value, strategy, demand, and capacity can represent a unique point along the feasible performance region. By determining the appropriate optimization function for each combination of factors, a single feasible performance region can identify the unique local maximum for each region. Variation can exist at a more granular level. Within a region, production lines can have different costs and capacities, sales people can have different strategies, capacities, and costs. With all local maxima represented on the feasible performance region, unique optimization functions can adjust the model to cater to the business reality at any level of granularity down to an individual level. All else being equal, changes in strategy can also be represented by different optimization functions. A shift in strategy from maximum profitability to maximum growth at break-even profitability can be represented as a change in the optimization function identifying a new local maximum. This means that a single ensemble model trained to define the feasible performance region for the business can be applied, and dynamically adjusted, to the current business reality, at multiple levels of granularity to optimize performance. This can greatly reduce the complexity, time, cost, and data required to generate individualized models. The feasible performance region can be established and optimized with a single model training effort. Specialized expert involvement can be minimized in the training and optimization process, which can greatly reduce development time and costs. Data requirements can also be reduced as the model can be tuned to individualized optimization functions. And all transactions used in training may not have to be specific to the individual. This can provide individualized performance even in situations where the individual does not have sufficient data to train a specific model.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:

receiving data characterizing a first output generated by one or more models of a first set of models associated with a first sub-organization of an organization, wherein the one or more of the first set of models is trained on a first dataset and a first set of resourcing levels corresponding to a first ratio of value per action or cost per action associated with the first set of models, and wherein a first set of resourcing levels defines an allocation of one or more resources related to the organization that are available to the first sub-organization;

training one or more models of a second set of models associated with a second sub-organization of the organization based on a second dataset, one or more global constraints of the organization, and the first output generated by the first set of models;

determining, by the one or more models of the second set of models, a second output indicative of performance under the first set of resourcing levels;

assessing, based on the determined second output of the one or more of the second set of models, performance of the one or more models of the second set of models, wherein the assessed performance indicates an effectiveness of the allocated organizational resources relative to the first ratio of value per action or cost per action; and retraining the first set of models or a subset thereof based on the assessed performance.

2. The method of claim 1, further comprising:

providing information associated with the assessment and/or the second output to the first set of models.

3. The method of claim 1, wherein the received data characterizing the first output of the one or more of the first set of models includes the global constraints and/or a first set of resourcing levels.

4. The method of claim 3, wherein a second set of resourcing levels are determined based on the first set of resourcing levels.

5. The method of claim 3, further comprising:

training one or more of the first set of models, wherein the training is based on one or more of the global constraint, the second output of the one or more of the second set of models, the first set of resource levels, and training data associated with the first set of models.

6. The method of claim 5, further comprising:

receiving a user input from a user associated with the second set of models, the input indicative of user constraints on the first output of the one or more of the first set of models; and training, the one or more of the first set of models, based on the user input.

7. The method of claim 5, further comprising:

assessing a combined performance of the first set of models and the second set of models;

determining, using the combined performance, a global feasible performance region, wherein the global feasible performance region is associated with the first and a second set of resourcing levels that are adjusted to increase the combined performance of the first set of models and the second set of models, wherein the first and second set of resourcing levels are balanced such that an output of the first set of models is within a capacity constraint of the second sub-organization; and displaying the global feasible performance region, wherein the global performance region comprises a plot of a range of performance indices as a function of constraints for the organization.

8. The method of claim 1, further comprising:

determining a first set of resourcing levels;

receiving user input from a user associated with the second set of models, the input indicative of a second set of resource levels;

selecting or training the first set of models using the first set of resourcing levels; and selecting or training the second set of models using the second set of resourcing levels.

9. The method of claim 1, further comprising training the first set of models, the training comprising:

receiving data characterizing the first set of models trained on the first dataset using a first set of resourcing levels, the first set of resourcing levels specifying a condition on outputs of the first set of models;

assessing, using the first set of resourcing levels, performance of the first set of models;

determining, using the assessment, a first feasible performance region, the first feasible performance region associating each resourcing level in the first set of resourcing levels with a model in the first set of models, wherein the first feasible performance region represents, for the first set of models, a boundary of optimal performance predictions as a function of the first set of resourcing levels; and displaying the first feasible performance region.

10. The method of claim 1, further comprising:

determining a first set of resourcing levels corresponding to a first ratio of value per action or cost per action associated with the first set of models;

determining a second set of resourcing levels such that a second ratio of value per action or cost per action associated with the second set of models;

wherein the first ratio and the second ratio are equal.

11. The method of claim 1, further comprising:

receiving data characterizing user input specifying a training objective;

wherein the first set of models is trained based at least on the training objective.

12. A system comprising:

at least one data processor; and memory storing computer executable instructions which, when executed by the at least one data processor causes the at least one data processor to perform operations comprising:

receiving data characterizing a first output generated by one or more models of a first set of models associated with a first sub-organization of an organization, wherein the one or more of the first set of models is trained on a first dataset and a first set of resourcing levels corresponding to a first ratio of value per action or cost per action associated with the first set of models, and wherein the first set of resourcing levels defines an allocation of one or more resources to the first sub-organization;

training one or more models of a second set of models associated with a second sub-organization of the organization based on a second dataset, one or more global constraints of the organization, and the first output generated by the first set of models;

determining, by the one or more models of the second set of models, a second output indicative of performance under the first set of resourcing levels;

assessing, based on the determined second output of the one or more of the second set of models, performance of the one or more models of the second set of models, wherein the assessed performance indicates an effectiveness of the allocated organizational resources relative to the first ratio of value per action or cost per action; and retraining the first set of models or a subset thereof based on the assessed performance.

13. The system of claim 12, the operations further comprising:

providing information associated with the assessment and/or the second output to the first set of models.

14. The system of claim 12, wherein the received data characterizing the first output of the one or more of the first set of models includes the global constraints and/or a first set of resourcing levels.

15. The system of claim 14, wherein a second set of resourcing levels are determined based on the first set of resourcing levels.

16. The system of claim 14, the operations further comprising:

training one or more of the first set of models, wherein the training is based on one or more of the global constraint, the second output of the one or more of the second set of models, the first set of resource levels, and training data associated with the first set of models.

17. The system of claim 16, the operations further comprising:

receiving a user input from a user associated with the second set of models, the input indicative of user constraints on the first output of the one or more of the first set of models; and training, the one or more of the first set of models, based on the user input.

18. The system of claim 16, the operations further comprising:

assessing a combined performance of the first set of models and the second set of models;

determining, using the combined performance, a global feasible performance region, wherein the global feasible performance region is associated with the first and a second set of resourcing levels the at are adjusted to increase the combined performance of the first set of models and the second set of models, wherein the first and second set of resourcing levels are balanced such that an output of the first set of models is within a capacity constraint of the second sub-organization; and displaying the global feasible performance region, wherein the global performance region comprises a plot of a range of performance indices as a function of constraints for the organization.

19. The system of claim 12, the operations further comprising:

determining a first set of resourcing levels;

receiving user input from a user associated with the second set of models, the input indicative of a second set of resource levels;

selecting or training the first set of models using the first set of resourcing levels; and selecting or training the second set of models using the second set of resourcing levels.

20. The system of claim 12, the operations further comprising training the first set of models, the training comprising:

receiving data characterizing the first set of models trained on the first dataset using the first set of resourcing levels, the first set of resourcing levels specifying a condition on outputs of the first set of models;

assessing, using the first set of resourcing levels, performance of the first set of models;

determining, using the assessment, a first feasible performance region, the first feasible performance region associating each resourcing level in the first set of resourcing levels with a model in the first set of models, wherein the first feasible performance region represents, for the first set of models, a boundary of optimal performance predictions as a function of the first set of resourcing levels; and displaying the first feasible performance region.

21. A system comprising:

at least one data processor; and memory storing instructions which, when executed by the at least one data processor, causes the at least one data processor to perform operations comprising:

training a first model associated with a first sub-organization of an organization based on a first dataset, the first model including a first plurality of submodels trained at differing resource levels corresponding to a first ratio of value per action or cost per action associated with the first plurality of submodels, wherein the differing resource levels define an allocation of one or more resources related to the organization that are available to the first sub-organization;

training a second model associated with a second sub-organization of the organization based on a second dataset, the second model including a second plurality of submodels trained at the differing resource levels based on global constraints of the organization;

determining a resource allocation between the first organization and the second organization such that a first level of resource is provided to the first organization and a second level of resource is provided to the second organization based on an assessed performance indicating an effectiveness of the allocated organizational resources;

selecting a first subgroup from the first model that corresponds to the first resource level; and selecting a second subgroup from the second model that corresponds to the second resource level.

22. The system of claim 21, wherein determining the resource allocation includes determining an optimal allocation of resources between the first organization and the second organization and based at least on a global constraint.

23. The system of claim 22, the operations further comprising:

receiving data characterizing a change to the global constraint or a new global constraint;

determining a second resource allocation between the first organization and the second organization such that a third level of resource is provided to the first organization and a fourth level of resource is provided to the second organization, wherein the determining the second resource allocation is based at least on the change to the global constraint or the new global constraint;

selecting a third subgroup from the first model that corresponds to the third resource level; and selecting a fourth subgroup from the second model that corresponds to the fourth resource level.

24. The system of claim 21, wherein determining the resource allocation includes determining an optimal allocation of resources between the first organization and the second organization based at least on an organizational objective.

* * * * *